(12) United States Patent
Lie

(10) Patent No.: US 6,795,048 B2
(45) Date of Patent: Sep. 21, 2004

(54) PROCESSING PIXELS OF A DIGITAL IMAGE

(75) Inventor: Kok Tjoan Lie, South Hurstville (AU)

(73) Assignee: Canon Kabushiki Kaisha, Tokyo (JP)

(*) Notice: Subject to any disclaimer, the term of this patent is extended or adjusted under 35 U.S.C. 154(b) by 118 days.

(21) Appl. No.: 09/846,365

(22) Filed: May 2, 2001

(65) Prior Publication Data

US 2002/0175925 A1 Nov. 28, 2002

(30) Foreign Application Priority Data

May 17, 2000 (AU) .............................................. PQ7580

(51) Int. Cl.[7] .............................................. G09G 5/02
(52) U.S. Cl. .................................... 345/88; 345/600
(58) Field of Search .............................. 345/88, 89, 97, 345/98, 100, 103, 147; 357/56; 700/47, 162

(56) References Cited

U.S. PATENT DOCUMENTS

| | | | | |
|---|---|---|---|---|
| 5,097,518 A | * | 3/1992 | Scott et al. ................. | 382/298 |
| 5,237,655 A | * | 8/1993 | Statt et al. ................. | 345/504 |
| 5,793,345 A | * | 8/1998 | Silverbrook ................. | 345/89 |

* cited by examiner

Primary Examiner—Amare Mengistu
Assistant Examiner—Nitin Patel
(74) Attorney, Agent, or Firm—Fitzpatrick, Cella, Harper & Scinto

(57) ABSTRACT

The apparatus 20 for processing pixels of a digital image comprises an image processor (600, 700, 800) for processing the pixels, wherein the image processor (600, 700, 800) comprises a plurality of color output channels 1304. The apparatus further comprises a controller (300) for configuring the image processor (600, 700, 800) to operate in a first color processing mode or a second color processing mode. The image processor (600, 700, 800) during the first color processing mode, processes pixels each having one or more pixel color components and outputs therefrom one said pixel at a time by outputting said one or more pixel color components on corresponding color output channels (1304). The image processor (600, 700, 800) during the second color processing mode, processes pixels each having one pixel color component and outputs therefrom one or more pixels at a time by outputting corresponding one pixel color components on corresponding color output channels (1304).

30 Claims, 17 Drawing Sheets

PROCESSING PIXELS OF A DIGITAL IMAGE

TECHNICAL FIELD OF THE INVENTION

The present invention relates to a method and apparatus for processing pixels of a digital image and, in particular, to the rendering of grey-scale graphic objects into raster pixel images.

BACKGROUND ART

Most object based graphics systems utilise a frame store or page buffer to hold a pixel-based image of the page or screen. Typically, the outlines of the graphic objects are calculated, filled and written into the frame store. For two-dimensional graphics, objects which appear in front of other objects are simply written into the frame store after the background objects, thereby replacing the background on a pixel-by-pixel basis. This is commonly known in the art as the "Painter's algorithm". Objects are considered in priority order, from the rearmost object to the foremost object, and, typically, each object is rasterised in scan line order and pixels are written to the frame store in sequential runs along each scan line.

There are essentially two problems with this technique. The first is that it requires fast random access to all the pixels in the frame store. This is because each new object considered could affect any pixel in the frame-store. For this reason, the frame store is normally kept in semiconductor random access memory (RAM). For high resolution color printers the amount of RAM required is very large, typically in excess of 100 MBytes, which is costly and difficult to operate at high speed. The second problem is that many pixels which are painted (rendered), are over-painted (re-rendered) by later objects. Painting the pixels with the earlier objects was a waste of time.

One method for overcoming the large frame-store problem is the use of "banding". When banding is used, only part of the frame-store exists in memory at any one time. All of the objects to be drawn are retained in a "display list". The whole image is rendered as above, but pixel painting (rendering) operations that try to paint (render) outside the fraction of the frame-store which exists are "clipped" out. After all the objects have been drawn, the fractional part of the frame-store is sent to the printer (or some other location) and another fraction of the frame-store is selected and the process repeated. There are penalties with this technique. For example, the objects being drawn must be considered and re-considered many times—once for each band. As the number of bands increases, so too does the repetitious examination of objects requiring rendering. The technique of banding does not solve the problem of the cost of over-painting.

Some other graphic systems consider the image in scan line order. Again, all the objects to be drawn are retained in a display list. On each scan line the objects which intersect that scan line are then considered in priority order and for each object, spans of pixels between object edge intersection points are set in a line store. This technique also overcomes the large frame store problem, but still suffers from the over-paint problem.

There are other techniques which overcome both the large frame-store problem and the over-painting problem. In one such technique, each scan line is produced in turn. Again, all the objects to be drawn are retained in a display list. On each scan line, the edges of objects which intersect that scan line are held in order of increasing coordinate of intersection with the scan line. These points of intersection, or edge crossings, are considered in turn and used to toggle an array of active flags. There is one active flag for each object priority which is of interest on the scan line. Between each pair of edges considered, the color data for each pixel which lies between the first edge and the next edge is generated by using a priority encoder on the active flags to determine which priority is topmost, and using the color associated with that priority for the pixels of the span between the two edges. In preparation for the next scan line, the coordinate of intersection of each edge is updated in accordance with the nature of each edge. Adjacent edges which become missorted as a result of this update are swapped. New edges are also merged into the list of edges.

This technique has the significant advantages that there is no frame store or line store, there is no over painting, and the object priorities are dealt with in constant order time, rather than order N time (where N is the number of priorities).

The output of such graphic system normally consists of a bus (24 or 32-bit wide) to carry pixel color data that toggles at every clock cycle or so. Accompanying the pixel data bus are some control signals that signify pixel's attributes and properties. The pixel color data is typically made of its color components, that is Red, Green, Blue, and with or without opacity channels (or Cyan, Magenta, Yellow and Black channels).

In the case of grey scale rendering, the systems either have a narrower data path (that is 8-bit wide) or make use of one of the four available channels in the color graphic system.

SUMMARY OF THE INVENTION

It is an object of the present invention to substantially overcome, or at least ameliorate, one or more disadvantages of existing arrangements.

According to one aspect of the invention, there is provided a method of processing pixels of a digital image, said method comprising the steps of: configuring an image processor to operate in a first processing mode or a second processing mode, said image processor having a plurality of color output channels; processing one or more color pixels each having one or more pixel color components and outputting one said color pixel at a time by outputting said one or more pixel color components on respective one or more said color output channels when said image processor is configured in said first processing mode; and processing one or more pixels each having one pixel color component and outputting one or more said pixels at a time by outputting said one or more pixels simultaneously on respective said color output channels when said image processor is configured in said second processing mode.

According to another aspect of the invention, there is provided apparatus for processing pixels of a digital image, said apparatus comprising: an image processor for processing pixels of a digital image, said image processor comprising a plurality of color output channels; and a controller for configuring the image processor to operate in a first processing mode or a second processing mode; said image processor processes one or more color pixels each having one or more pixel color components and outputting one said color pixel at a time by outputting said one or more pixel color components on respective one or more said color output channels when said image processor is configured in said first processing mode; and said image processor processes one or more pixels each having one pixel color component and outputting one or more said pixels at a time by outputting said one or more pixels simultaneously on respective said color output channels when said image processor is configured in said second processing mode.

According to another aspect of the invention, there is provided a method of processing pixels of a digital image, said method comprising the steps of: configuring an image processor to operate in a first operating mode or a second operating mode, said image processor having a plurality of color output channels; generating, during said first operating mode, one or more color pixels having one or more pixel color components; outputting, during said first operating mode, said generated color pixels one at a time by outputting said one or more pixel color components of each generated pixel on corresponding said color output channels; generating, during said second operating mode, one or more fill commands each comprising a parameter indicating the number of consecutive pixel locations in raster order to which the fill command applies, wherein said number can vary from one to a maximum number equal to the number of said color output channels; generating, during said second operating mode, one or more pixels in response to one or more said fill commands for one or more said pixel locations, wherein the number of pixels generated is dependent upon the number of fill commands and said parameter of the fill commands and wherein said generated pixels having one pixel color component; outputting, during said second operating mode, one or more said pixels at a time by outputting one or more said pixels simultaneously on one or more said color output channels.

According to another aspect of the invention, there is provided apparatus for processing pixels of a digital image, said apparatus comprising: a host processor for configuring an image processor to operate in a first operating mode or a second operating mode, said image processor having a plurality of color output channels; said image processor comprising: a fill module for generating, during said first operating mode, one or more color pixels having one or more pixel color components and outputting said generated pixels one at a time by outputting said one or more pixel color components of each generated pixel on corresponding said color output channels; a module for generating, during said second operating mode, one or more fill commands each comprising a parameter indicating the number of consecutive pixel locations in raster order to which the fill command applies, wherein said number can vary from one to a maximum number equal to the number of said color output channels; and said fill module generating, during said second operating mode, one or more pixels in response to one or more said fill commands for one or more said pixel locations, and simultaneously outputting one or more said pixels on corresponding one or more said color output channels, wherein the number of pixels generated is dependent upon the number of fill commands and said parameter of the fill commands and wherein said generated pixels each having one pixel color component.

According to another aspect of the invention, there is provided a method of processing pixels of a digital image, said method comprising the steps of: configuring an image processor to operate in a first operating mode or a second operating mode, said image processor having a plurality of color output channels; generating, during said first operating mode, one or more fill commands; generating, during said first operating mode, one or more color pixels in response to one or more respective said fill commands for a pixel location, wherein said generated color pixels having one or more pixel color components; outputting, during said first operating mode, said generated pixels one at a time by outputting said one or more pixel color components of each generated pixel on corresponding said color output channels; generating, during said second operating mode, one or more fill commands each comprising a parameter indicating the number of consecutive pixel locations in raster order to which the fill command applies, wherein said number can vary from one to a maximum number equal to the number of said color output channels; generating, during said second operating mode, one or more pixels in response to one or more said fill commands for one or more said pixel locations, wherein the number of pixels generated is dependent upon the number of fill commands and said parameter of the fill commands and wherein said generated pixels each having one pixel color component; outputting, during said second operating mode, one or more said pixels simultaneously on corresponding one or more said color output channels.

According to another aspect of the invention, there is provided apparatus for processing pixels of a digital image, said apparatus comprising: a host processor for configuring an image processor to operate in a first operating mode or a second operating mode, said image processor comprising: a priority module for generating, during said first operating mode, one or more fill commands for corresponding pixel locations; a fill module generating, during said first operating mode, one or more color pixels in response to one or more respective said fill commands for a said pixel location, and outputting said generated color pixels one at a time by outputting one or more pixel color components of each generated color pixel on corresponding color output channels; the priority module generating, during said second operating mode, one or more fill commands each comprising a parameter indicating the number of consecutive pixel locations in raster order to which the fill command applies, wherein said number can vary from one to a maximum number equal to the number of said color output channels; the fill module generating, during said second operating mode, one or more pixels in response to one or more said fill commands for one or more said pixel locations, and simultaneously outputting one or more said generated pixels on corresponding one or more said color output channels, wherein the number of pixels generated is dependent upon the number of fill commands and said parameter of the fill.

According to another aspect of the invention, there is provided a method of generating commands for producing pixels of a digital image, said method comprising the steps of: generating, during said first operating mode, one or more fill commands for a pixel location; generating, during said second operating mode, one or more fill commands each comprising a parameter indicating the number of consecutive pixel locations in raster order to which the fill command applies, wherein said number can vary from one to a maximum number equal to the number of said color output channels;

According to another aspect of the invention, there is provided apparatus for generating commands for producing pixels of a digital image, said apparatus comprising: a generator for generating, during said first operating mode, one or more fill commands for a pixel location and for generating, during said second operating mode, one or more fill commands each comprising a parameter indicating the number of consecutive pixel locations in raster order to which the fill command applies, wherein said number can vary from one to a maximum number equal to the number of said color output channels.

According to another aspect of the invention, there is provided a computer readable medium comprising a computer program for generating commands for producing pixels of a digital image, said computer program comprising: code for generating, during said first operating mode, one or more fill commands for a pixel location and for generating, during said second operating mode, one or more fill commands each comprising a parameter indicating the number of consecutive pixel locations in raster order to which the fill command applies, wherein said number can vary from one to a maximum number equal to the number of said color output channels.

BRIEF DESCRIPTION OF THE DRAWINGS

A number of preferred embodiments of the present invention will now be described with reference to the drawings, in which.

DETAILED DESCRIPTION INCLUDING BEST MODE

Figure 1:
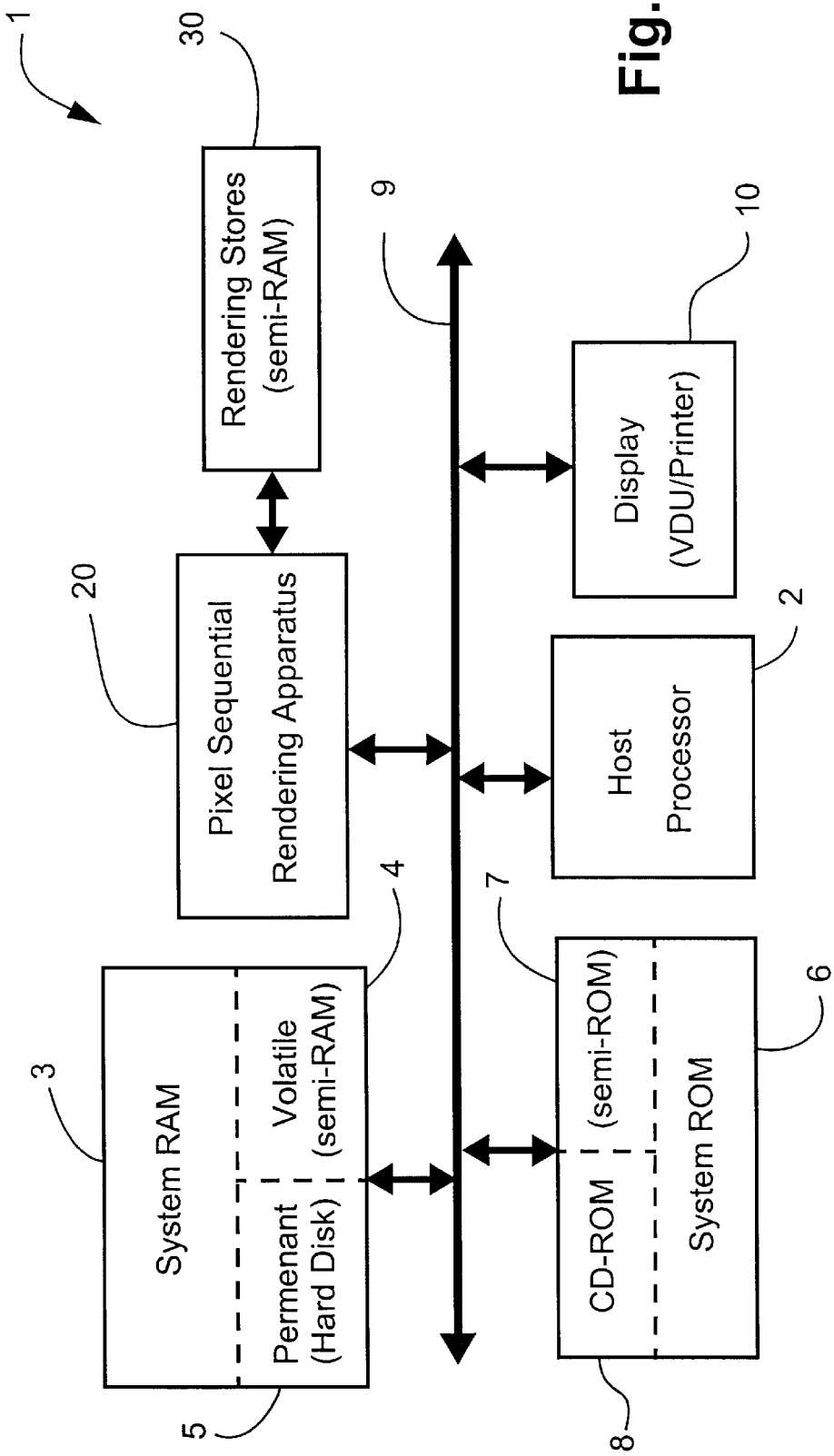
FIG. 1 is a schematic block diagram representation of a computer system incorporating the preferred embodiment.

Where reference is made in any one or more of the accompanying drawings to steps and/or features, which have the same reference numerals, those steps and/or features have for the purposes of this description the same function (s) or operation(s), unless the contrary intention appears.

Turning now to FIG. 1, there is illustrated schematically a computer system 1 configured for rendering and presentation of computer graphic object images. The system includes a host processor 2 associated with system random access memory (RAM) 3, which may include a non-volatile hard disk drive or similar device 5 and volatile, semiconductor RAM 4. The system 1 also includes a system read-only memory (ROM) 6 typically founded upon semiconductor ROM 7 and which in many cases may be supplemented by compact disk devices (CD ROM) 8. The system 1 may also incorporate some means 10 for displaying images, such as a video display unit (VDU) or a printer, both which operate in raster fashion.

The above-described components of the system 1 are interconnected via a bus system 9 and are operable in a normal operating mode of computer systems well known in the art, such as IBM PC/AT type personal computers and arrangements evolved therefrom, Sun Sparcstations and the like.

Also seen in FIG. 1, a pixel sequential rendering apparatus 20 connects to the bus 9, and in the preferred embodiment is configured for the sequential rendering of pixel-based images derived from graphic object-based descriptions supplied with instructions and data from the system 1 via the bus 9. The apparatus 20 may utilize the system RAM 3 for the rendering of object descriptions although preferably the rendering apparatus 20 may have associated therewith a dedicated rendering store arrangement 30, typically formed of semiconductor RAM.

Figure 2:
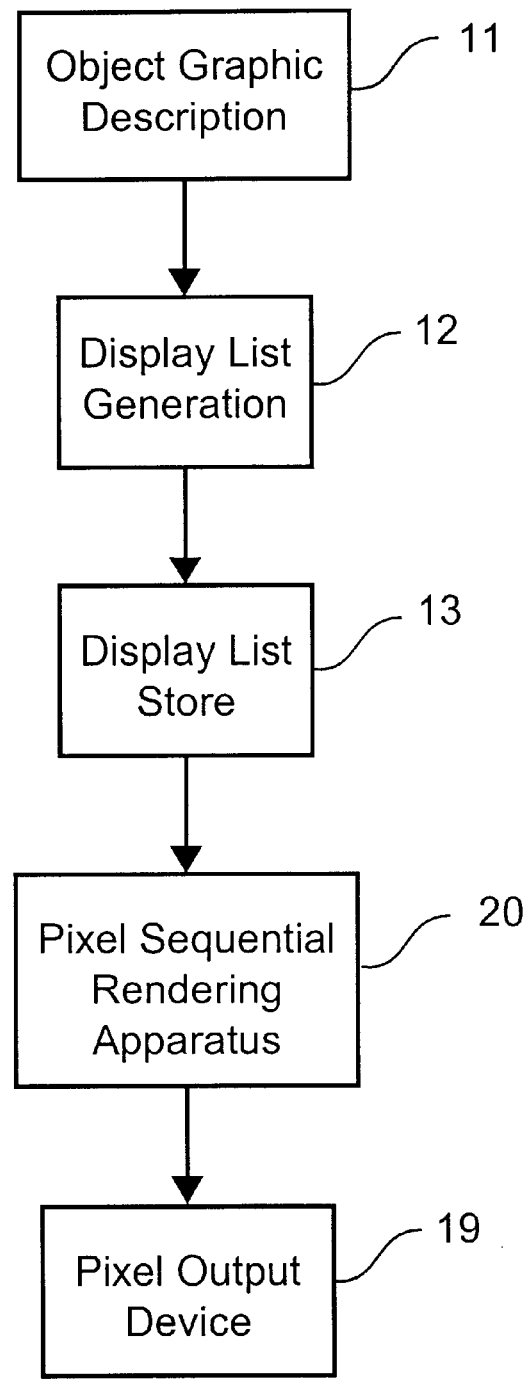
FIG. 2 is a block diagram showing the functional data flow of the preferred embodiment.

A functional data flow diagram of the preferred embodiment is shown in FIG. 2. The functional flow commences with an object graphic description 11 which is used to describe those parameters of graphic objects in a fashion appropriate to be generated by the host processor 2 and/or, where appropriate, stored within the system RAM 3 or derived from the system ROM 6, and which may be interpreted by the pixel sequential rendering apparatus 20 to render therefrom pixel-based images. For example, the object graphic description 11 may incorporate objects with edges in a number of formats including straight edges (simple vectors) that traverse from one point on the display to another, or an orthogonal edge format where a two-dimensional object is defined by a plurality of edges including orthogonal lines. Further data formats such as cubic splines and the like may also be used. An object may contain a mixture of many different edge types. Typically, common to all formats are identifiers for the start and end of each line (whether straight or curved) and typically, these are identified by a scan line number thus defining a specific output space in which the curve may be rendered.

The operation of the preferred embodiment will be described partly with reference to the simple example of rendering an image 78 shown in FIG. 7. The image 78 is seen to include two graphical objects, in particular, a partly transparent blue-colored triangle 80 rendered on top of and thereby partly obscuring an opaque red colored rectangle 90. As seen, the rectangle 90 includes side edges 92, 94, 96 and 98 defined between various pixel positions (X) and scan line positions (Y). Because the edges 96 and 98 are formed upon the scan lines (and thus parallel therewith), the actual object description of the rectangle 90 can be based solely upon the side edges 92 and 94, such as seen in FIG. 8A. In this connection, edge 92 commences at pixel location (40,35) and extends in a raster direction down the screen to terminate at pixel position (40,105). Similarly, the edge 94 extends from pixel position (160,35) to position (160,105). The horizontal portions of the rectangular graphic object 90 may be obtained merely by scanning from the edge 92 to the edge 94 in a rasterised fashion.

Figure 8A:
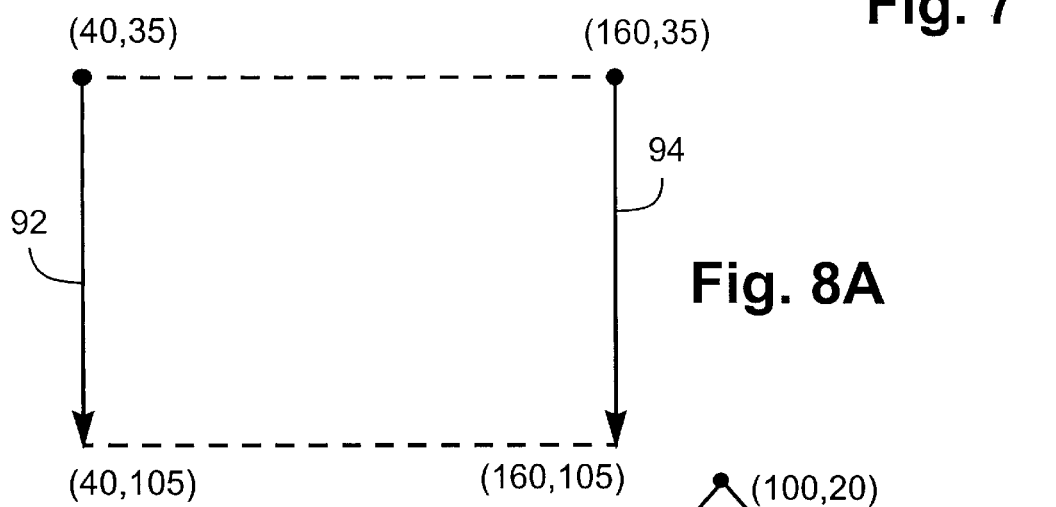
FIGS. 8A and 8B illustrate the vector edges of the objects of FIG. 7.
Figure 8B:
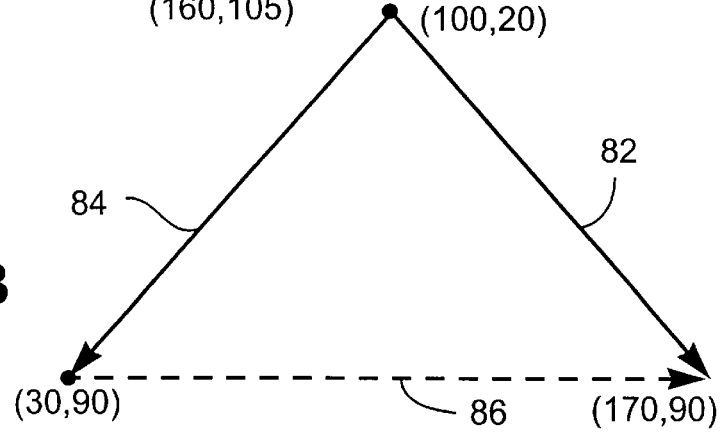

The blue triangular object 80 however is defined by three object edges 82, 84 and 86, each seen as vectors that define the vertices of the triangle. Edges 82 and 84 are seen to commence at pixel location (100,20) and extend respectively to pixel locations (170,90) and (30,90). Edge 86 extends between those two pixel locations in a traditional rasterised direction of left to right. In this specific example because the edge 86 is horizontal like the edges 96 and 98 mentioned above, is it not essential that the edge 86 be defined, since the edge 86 is characterised by the related endpoints of the edges 82 and 84 (see FIG. 8B). In addition to the starting and ending pixel locations used to describe the edges 82 and 84, each of these edges will have associated therewith the slope value in this case +1 and −1 respectively.

Figure 9:
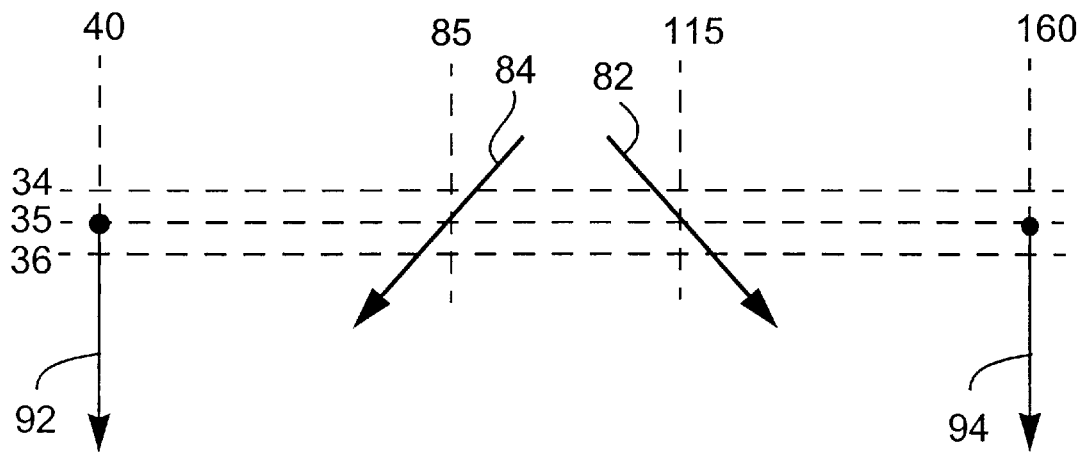
FIG. 9 illustrates the rendering of a number of scan lines of the image of FIG. 7.
Figure 10:
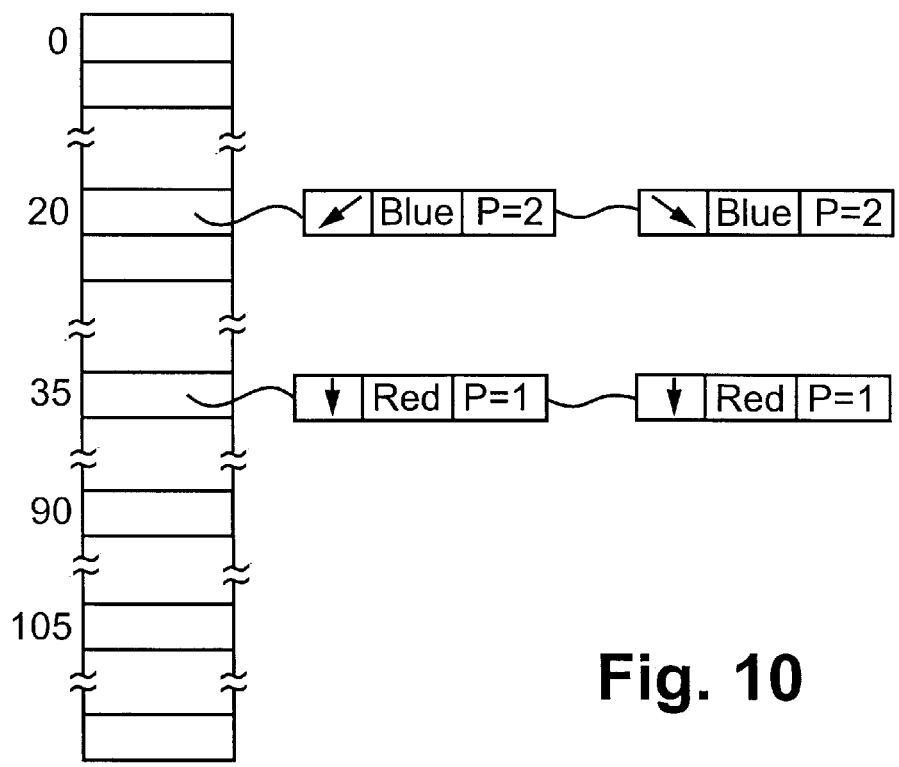
FIG. 10 illustrates the snapshot of the processed pixel at various modules output when doing color rendering of FIG. 7.

FIG. 9 shows the manner in which the rectangle 90 is rendered, this commencing on scan line 35 and how the edges 82 and 84 intersect the scan line 35. It will be apparent from FIG. 9 that the rasterisation of the image 78 requires resolution of the two objects 90 and 80 in such a fashion that the object having the higher priority level is rendered "above" that with a lower priority level. This is seen from FIG. 10 which represents an edge list record used for the rendering of the image 78. The record of FIG. 10 includes two entries, one for each of the objects, and which are arranged at a scan line value corresponding to the start, in a raster rendering order, of the respective object. It will be seen from FIG. 10 that the edge records each have an associated priority level of the object and further detail regarding the nature of the edge being described (eg. color, slope, etc.)

Figure 3:
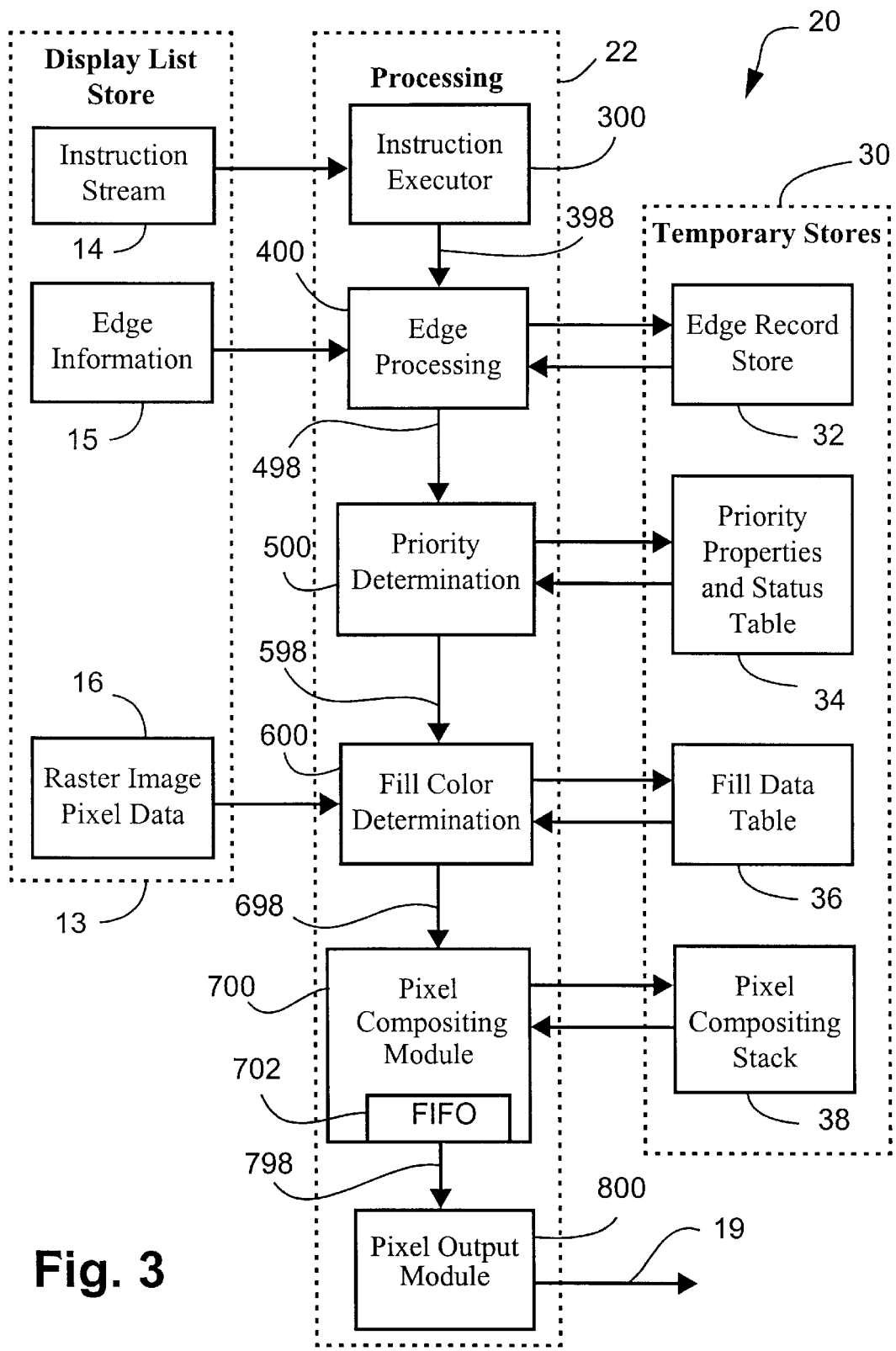
FIG. 3 is a schematic block diagram representation of the pixel sequential rendering apparatus and associated display list and temporary stores of the preferred embodiment.

The display list generation 12 is preferably implemented as a software module executing on the host processor 2 with attached ROM 6 and RAM 3. The display list generation 12 converts an object graphics description, expressed in any one or more of the well known graphic description languages, graphic library calls, or any other application specific format, into a display list. The display list is typically written into a display list store 13, generally formed within the RAM 4 but which may alternatively be formed within the rendering stores 30. As seen in FIG. 3, the display list store 13 can include a number of components, one being an instruction stream 14, another being edge information 15 and where appropriate, raster image pixel data 16.

The instruction stream 14 includes code interpretable as instructions to be read by the pixel sequential rendering apparatus 20 to render the specific graphic objects desired in any specific image. For the example of the image shown in FIG. 7, the instruction stream 14 could be of the form of:

(1) render (nothing) to scan line 20;
(2) at scan line 20 add two blue edges 82 and 84;
(3) render to scan line 35;
(4) at scan line 35 add two red edges 92 and 94;
(5) render to completion.

Figure 7:
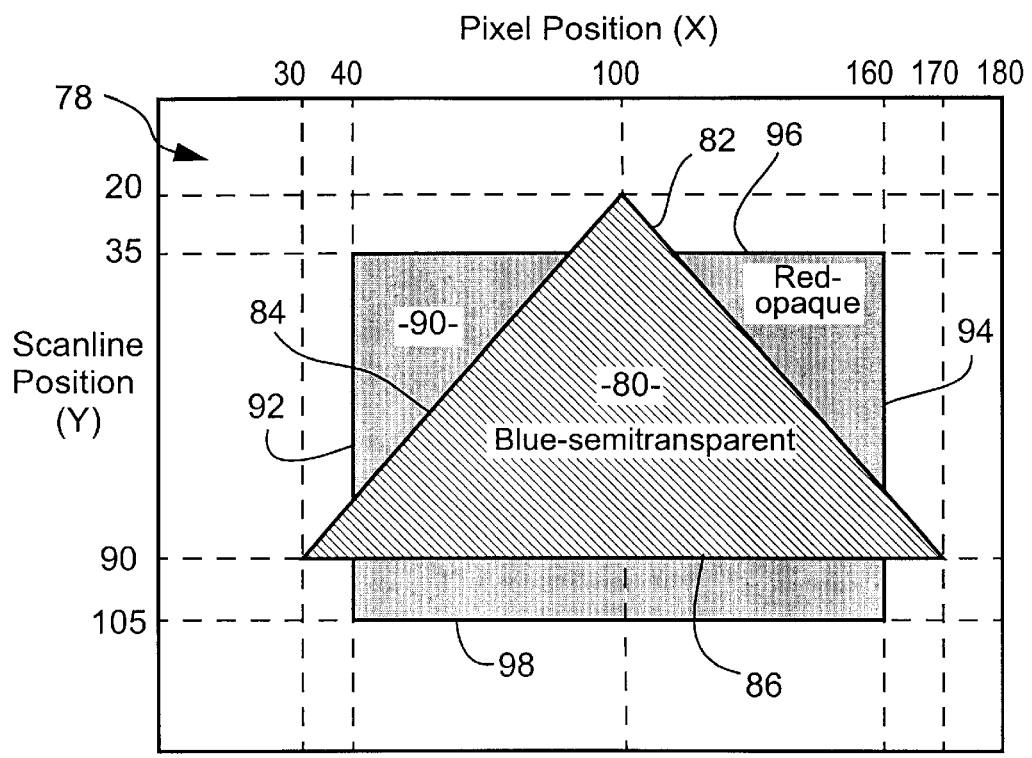
FIG. 7 illustrates a two-object image used as an example for explaining the operation of preferred embodiment.

Similarly, the edge information 15 for the example of FIG. 7 may include the following:

edge 84 starts at pixel position 100, runs for 70 scanlines with slope of −1;
edge 82 starts at pixel position 100, runs for 70 scanlines with slope of 1;
edge 92 starts at pixel position 40, runs for 70 scanlines with slope of 0;
edge 94 starts at pixel position 160, runs for 70 scanlines with slope of 0.

FIG. 7 includes no raster image pixel data and hence none need be stored in the store portion 16 of the display list 13.

The display list store 13 is read by a pixel sequential rendering apparatus 20, which is typically implemented as an integrated circuit although it may be implemented as an equivalent software module executing on a general purpose processing unit, such as the host processor 2. The pixel sequential rendering apparatus 20 converts the display list into a stream of raster pixels which can be forwarded to another device, for example, a printer, a display, or a memory store.

FIG. 3 shows the configuration of the pixel sequential rendering apparatus 20, the display list store 13 and the temporary rendering stores 30. The processing stages 22 of the pixel-sequential render apparatus 20 include an instruction executor 300, an edge processing module 400, a priority determination module 500, a fill color determination module 600, a pixel compositing module 700, and a pixel output module 800. The processing operations use the temporary stores 30 which as noted above, may share the same device (eg. magnetic disk or semiconductor RAM) as the display list store 13, or may be implemented as individual stores for reasons of speed optimisation. The edge processing module 400 uses an edge record store 32 to hold edge information which is carried forward from scan-line to scan-line. The priority determination module 500 uses a priority properties and status table 34 to hold information about each priority, and the current state of each priority with respect to edge crossings while a scan-line is being rendered. The fill color determination module 600 uses a fill data table 36 to hold information required to determine the fill color of a particular priority at a particular position. The pixel compositing module 700 uses a pixel compositing stack 38 to hold intermediate results during the determination of an output pixel that requires the colors from multiple priorities to determine its value.

The processing steps shown in the embodiment of FIG. 3 take the form of a processing pipeline 22. In this case, the modules of the pipeline may execute simultaneously on different portions of image data in parallel, with messages passed between them as described below.

The instruction executor 300 reads and processes instructions from the instruction stream 14 and formats the instructions into messages that transferred via an output 398 to the other modules 400, 500, 600 and 700 within the pipeline 22. In the preferred embodiment, the instruction stream 14 may include the instructions:

The instruction executor 300 is typically formed by a microcode state machine which maps instructions and decodes them into pipeline operations for passing to the various modules. A corresponding software process may alternatively be used.

Figure 4:
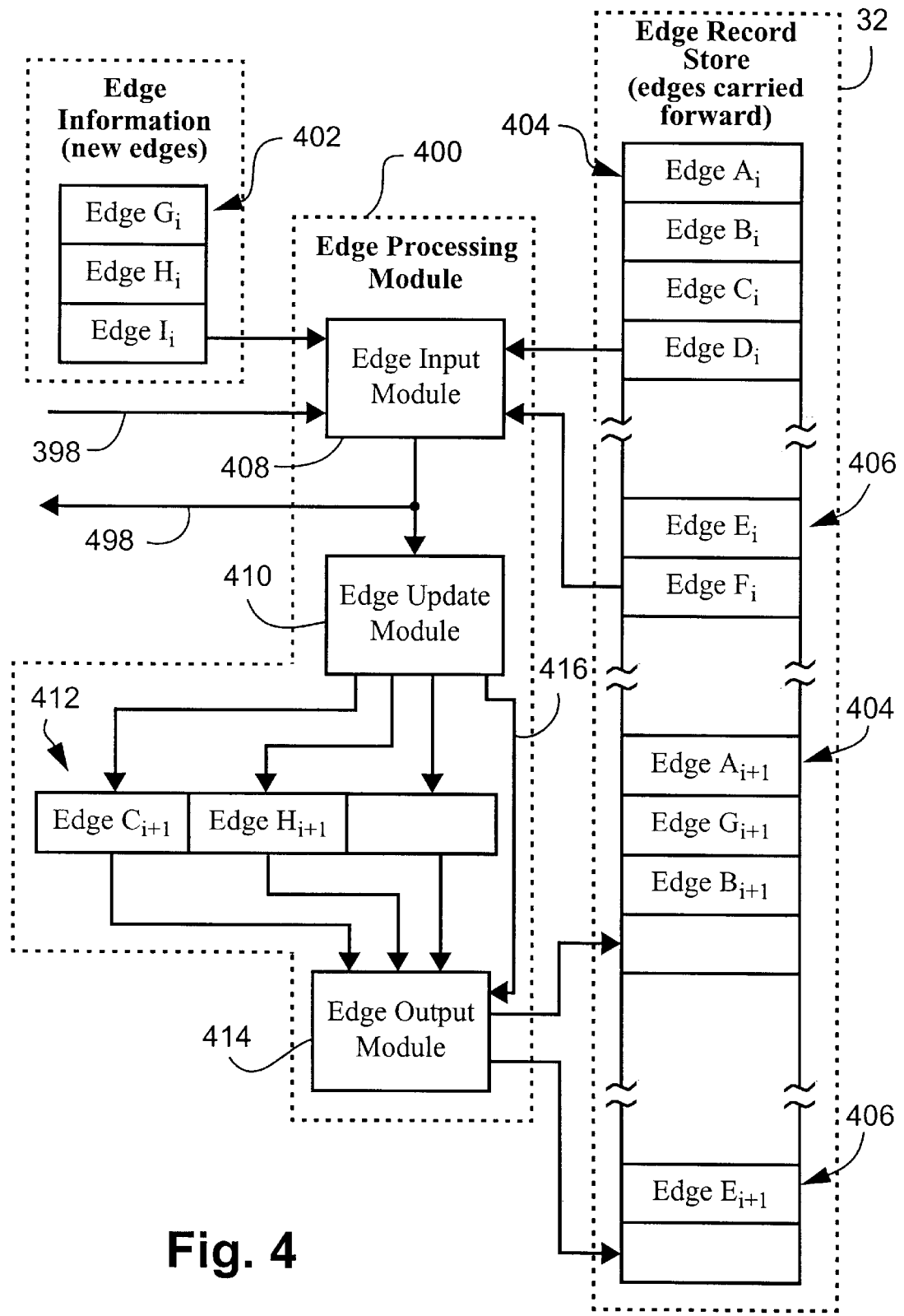
FIG. 4 is a schematic functional representation of the edge processing module of FIG. 2.

The operation of the edge processing module 400 during a scanline render operation will now be described with reference to FIG. 4. The initial conditions for the rendering of a scanline is the availability of three lists of edge records. Any or all of these lists may be empty. These lists are a new edge list 402, obtained from the edge information 15 and which contains new edges set by an instruction, a main edge list 404 which contains edge records carried forward from the previous scanline, and a spill edge list 406 which also contains edge records carried forward from the previous scanline. Each edge record may include one or more of the following parameters:

a current scanline intersection coordinate (referred to here as the X coordinate),
a count (referred to herein as NY) of how many scanlines a current segment of this edge will last for (in some embodiments this may be represented as a Y limit),
a value to be added to the X coordinate of this edge record after each scanline (referred to here as the DX), a value to be added to the DX of this edge record after each scanline (referred to here as the DDX), one or more priority numbers (P), a direction (DIR) flag which indicates whether the edge crosses scanlines from left to right, or from right to left, in the usual raster (top-down) manner, and an address (ADD) of a next edge segment in the list.

The records in each of the three lists 402, 404 and 406 are arranged in order of scanline intersection (X) coordinate. This is typically obtained by a sorting process, initially managed by an edge input module 408 which receives messages, including edge information, from the instruction executor 300. Where appropriate, the edge input module 408 relays messages to modules 500, 600 and 700 downstream in the pipeline 22 via an output 498.

The Edge Input Module 408 maintains references into and receives edge data from each of the three lists 402, 404, and 406. Thereafter, the edge input module 408 selects an edge record from one of the three referenced edge records such that the record selected is the one with the least X coordinate out of the three referenced records. The edge just selected is formatted into a message and sent to an edge update module 410. Also, certain fields of the edge, in particular the current X, the priority numbers, and the direction flag, and others are formatted into a message which is forwarded to the priority determination module 500 as an output 498 of the edge processing module 400 via a FIFO 518.

Upon receipt of an edge, the Edge Update Module 410 decrements the NY count and updates one or more relevant edge parameters. If NY count has reached zero, a new segment is read from the address indicated by the next segment address and calculates the X coordinate for the next scanline for the edge. Once the edge record is modified, the Edge Update Module 410 signals to Edge Output Module 414 that a new edge has been added to the edge pool 412 via a line 416. The edge record is then sorted by the Edge Output Module 414, prior to storing the edge records back into the edge record store 32.

The FIFO 518 acts to de-couple the operation of the edge processing module 400 and the priority determination module 500. A priority state table 502, comprising part of the tables 34 mentioned above, is used to hold information about each object priority. Preferably the FIFO 518 is sized to enable the receipt from the edge processing module 400 and transfer to the priority state table 502 of a full scanline of edge-crossings in a single action. Such permits the priority determination module 500 to correctly handle multiple edge-crossings at the same pixel (X) location. The priority state table 502 and priority data table (eg the level activation table 530) are updated upon receipt of each crossing message(s) at the same pixel X location. Each record in the priority state table 502 records fill parameters such as:

a fill-rule flag which indicates whether this priority is to have its inside versus outside state determined by the application of the odd-even fill rule or the non-zero winding fill rule;

a fill count which is modified in a manner indicated by the fill rule each time a edge effecting this priority is crossed;

a clipper flag and clip type flag which indicates whether this priority is to be used for clipping or filling and the type of clip (clip-in or clip-out);

a flag which records whether this priority requires levels beneath it to be calculated first, referred to as the "need-below" flag.

Figure 11A:
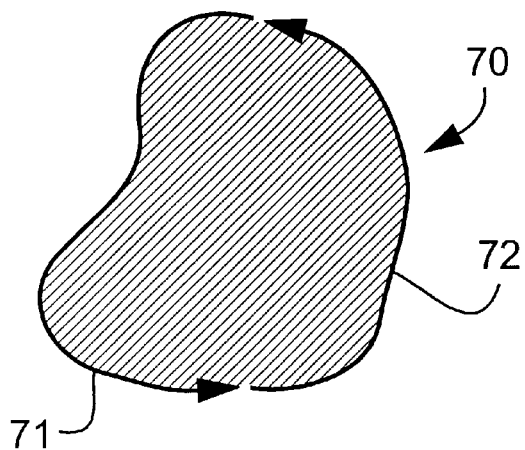
FIGS. 11A and 11B illustrate the odd-even and non-zero winding fill rules.
Figure 11B:
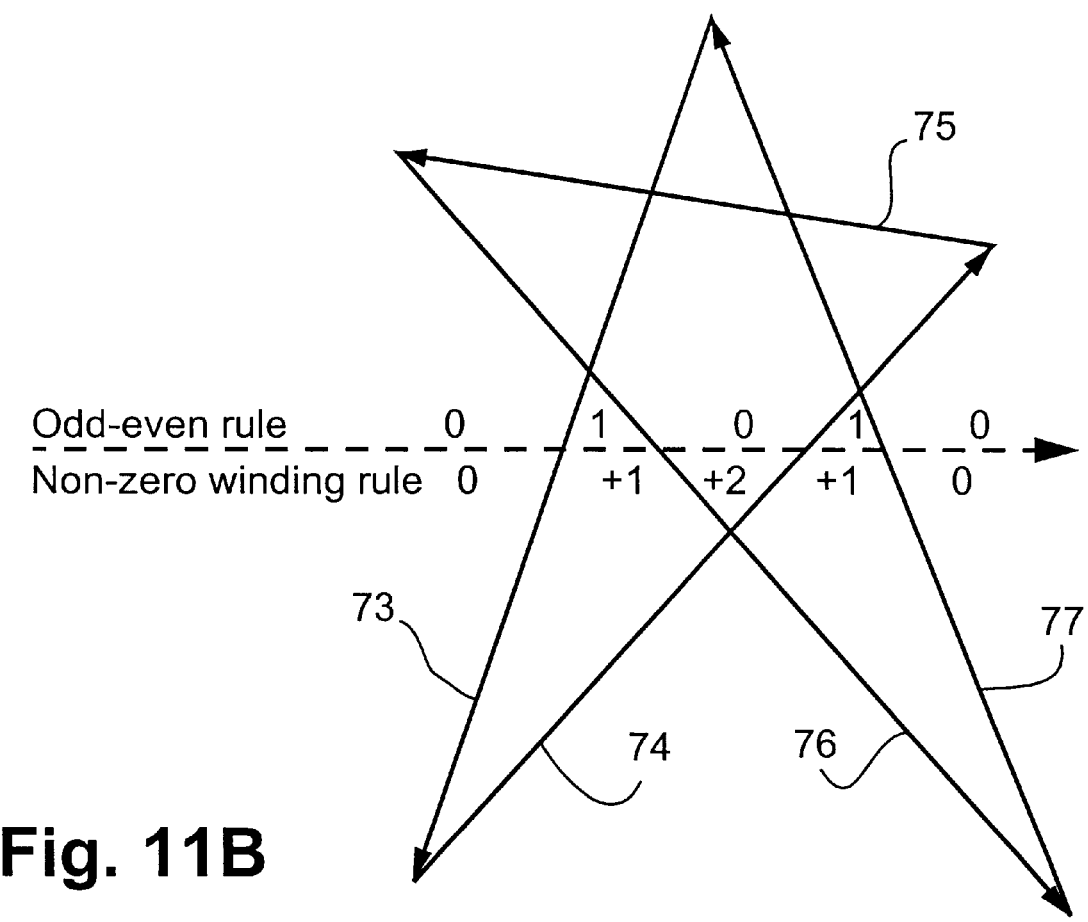

FIGS. 11A and 11B demonstrate the application of the odd-even and non-zero winding rules. For the purposes of the non-zero winding rule, FIG. 11A illustrates how the edges 71 and 72 of an object 70 are allocated a notional direction, according to whether the edges are downwards-heading or upwards-heading respectively. In order to form a closed boundary, edges link nose-to-tail around the boundary. The direction given to an edge for the purposes of the fill-rule (applied and described later) is independent of the order in which the segments are defined. Edge segments are defined in the order in which they are tracked, corresponding to the rendering direction.

FIG. 11B shows a single object (a pentagram) having two downwards-heading edges 73 and 76, and three upwards-heading edges 74, 75 and 77. The odd-even rule operates by simply toggling a Boolean value as each edge is crosses the scanline in question, thus effectively turning-on or turning-off an object color. The non-zero winding rule increments and decrements a fill count value dependent upon the direction of an edge being crossed. In FIG. 11B, the first two edges 73 and 76 encountered at the scanline are downwards-heading and thus traversal of those edge increment the fill count, to +1 and +2 respectively. The next two edges 74 and 77 encountered by the scanline are upwards-heading and accordingly decrement the fill count, to +1 and 0 respectively.

In some embodiments some of this information is associated with edges in the display list 13 and various edge lists described above, and forwarded as part of the edge crossing message to the priority determination module 500. In particular, the fill-rule flag, the clipper flag, the clip type flag, and the need-below flag and other information may be handled in this manner.

Figure 5:
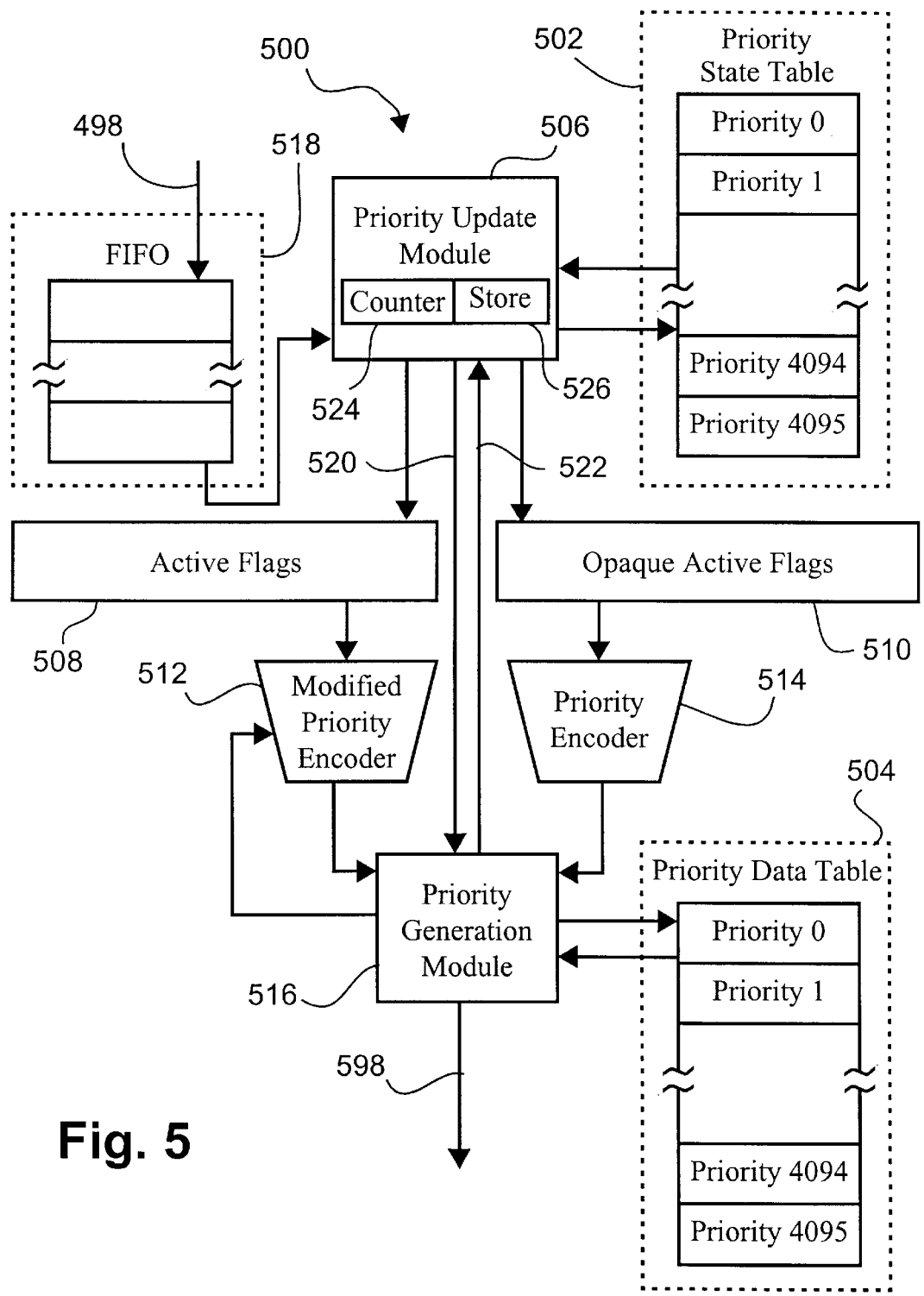
FIG. 5 is a schematic functional representation of the priority determination module of FIG. 2.

Returning to FIG. 5, the priority update module 506 maintains a counter 524 which records the scanline intersection coordinate up to which it has completed processing. This will be referred to as the current X of the priority update module 506. The initial value at the start of a scanline is zero.

Upon examining an edge crossing message received at the head of FIFO 518, the priority update module 506 compares the X intersection value in the edge crossing message with its current X. If the X intersection value in the edge crossing message is equal to the current X of the priority update module 506, the priority update module processes the edge crossing message, if greater than the current X, the priority update module generates fill commands for each pixel in the difference between X intersection value in the edge crossing and current X.

A priority is active at a pixel if the pixel is inside the boundary edges which apply to the priority, according to the fill-rule for that priority, and the clip count for the priority is zero. A priority is exposed if it is the uppermost active priority, or if all the active priorities above it have their corresponding need-below flags set. In this fashion, pixel values may be generated using only the fill data of the exposed priorities.

The need-below flag for a priority is established in the information of the display list and is used to inform the pixel generating system that any active priorities beneath the priority in question do not contribute to the pixel value being rendered, unless the flag is set. The flag is cleared where appropriate to prevent extra compositing operations which would otherwise contribute nothing to the final pixel value.

The process includes, for each priority in the edge crossing message and with reference to fields of the priority state table record indicated by that priority, the steps of:

(i) noting the current fill count of the current priority;

(ii) either:

(a) if the fill rule of the current priority is odd-even, setting the fill count to zero if it is currently non-zero, else setting it to any non-zero value, or (b) if the fill rule of the current priority is non-zero winding, incrementing or decrementing (depending on the edge direction flag) the fill count; and (iii) comparing the new fill count with the noted fill count and if one is zero and the other is non-zero performing an "active flag update" (described below) operation on the current priority.

Some embodiments may use a separate edge crossing message for each priority rather than placing a plurality of priorities in each edge crossing message.

An active flag update operation includes first establishing a new active flag for the current priority. The active flag is non-zero if the fill count for the priority in the priority state table 502 is non-zero and the clip count for the priority is zero, else the active flag is zero. The second step in the active flag update operation is to store the determined active flag in an active flags array 508 at the position indicated by the current priority, then if the need-below flag in the priority state table for the current priority is zero, also storing the active flag in an opaque active flags array 510 at the position indicated by the current priority.

When the X intersection value in the edge crossing message is greater than the current X of the priority update module 506, the priority update module 506 forms a count of how many pixels to generate, being the difference between the X intersection value in the edge crossing message and the current X, this count is formatted into a priority generation message, which is sent via a connection 520 to a priority generation module 516. The priority update module 506 then waits for a signal 522 from the priority generation module 516 indicating that processing for the given number of pixels has completed. Upon receipt of the signal 522, the priority update module 506 sets its current X to the X intersection value in the edge crossing message and continues processing as described above.

The priority generation module 516 operates with reference to a priority data table 504, also formed within the tables 34, which is used to hold information about each priority. Each record in the priority data table 504 may include:

a fill table address and type, a compositing operation codes and flags, a flag which records whether the color of this priority is constant for a given Y, referred to here as the "x-independent" flag.

Upon receipt of a priority generation message 520, the priority generation module 516 performs a "pixel priority generation operation" (described below) a number of times indicated by the count it has been supplied, thereupon it signals 522 the priority update module 506 that it has completed the operation.

Each pixel priority generation operation includes firstly using a priority encoder 514 (eg. a 4096 to 12 bit priority encoder) on the opaque active flags array 510 to determine the priority number of the highest opaque active flag. This priority (if any) is used to index the priority data table 504 and the contents of the record so referenced is formed into a fill priority message output 598 from the priority generation module 516 and sent to the fill color determination module 600. Further, if a priority was determined by the previous step (ie. there was at least one opaque active flag set), the determined priority is held, and is referred to as the "current priority". If no priority was determined the current priority is set to zero. The priority generation module 516 then repeatedly uses a modified priority encoder 512 on the active flag array 508 to determine the lowest active flag which is greater than the current priority. The priority so determined (if any) is used to index the priority data table 504 and the contents of the record so referenced is formed into a fill priority message and is sent 598 to the fill color determination module 500, then the determined priority is used to update the current priority. This step is used repeatedly until there is no priority determined (that is, there is no priority flagged in the active flags which is greater than the current priority).

As a preferred feature to the basic operation described above, the priority generation module 516 notes the value of the x-independent flag of each message which it forwards to the fill color determination module 600 while it processes the first pixel of a sequence. If all the forwarded messages have the x-independent flag specified, all subsequent messages in the span of pixels between adjacent edge intersections can be replaced by a single repeat specification of count minus one. This is done by producing a repeat message and sending it to the fill color determination module 600 in place of all further processing in this sequence.

As another preferred feature to the basic operation described above, the priority generation module 516 sends the highest opaque priority via the connection 522 to the priority update module 506 after each level generation message. The priority update module 506 holds this in a store 526. The priority determination module 506 then, performs a test that the X intersection in the message is greater than the current X and that at least one of the levels in the message is greater than or equal to the highest opaque priority, before producing a pixel priority generation message. By doing this, fewer pixel priority determination operations may be done and longer repeats sequence may be generated.

Figure 12A:
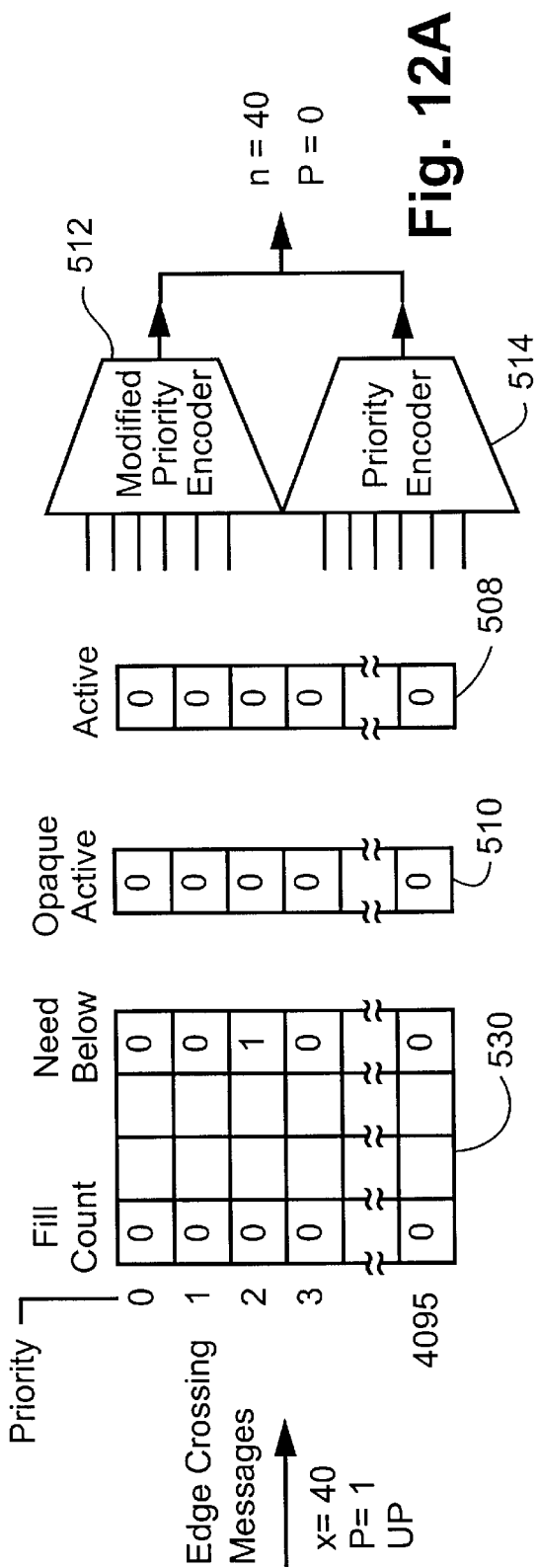
FIGS. 12A to 12E illustrates the priority filling routine implemented by the arrangement of FIG. 5.

FIGS. 12A to 12E illustrate operation of the priority tables 502 and 504, which in the preferred embodiment are merged into a single table, called a level activation table 530) together with arrays 508, 510 and encoders 512 and 514. As seen in FIG. 12A, edge crossing messages are received in order for a scanline from the edge processing module 400 and are loaded into the table 530, which is arranged in priority order. The edge crossing messages include, in this example, an incrementing direction according to the non-zero winding rule of the edge traversal. It is possible for no entries in the priority table 530 to be set.

The level activation table as illustrated 530 includes column entries for fill count, which are determined from the edge according to the non-zero winding rule or, where appropriate, the odd-even rule. The need-below flag is a property of a priority and is set as part level properties prior to rendering operation. The need-below is set for all priority levels when the table 530 is loaded. Other columns such as "clip count" and "fill index table" may be used, but for this example are omitted for simplicity of explanation. Where no level is active the corresponding entries are set to zero. Further, the values of the arrays 510 and 508 are updated from the table 530 after receiving a subsequent edge crossing.

From FIG. 12A, it will be apparent that, for convenience, a number of records have been omitted for clarity. Typically, the level activation table 530 would include, arranged in priority order, the following records:

fill count clip count fill type activation condition and flags, including
- need—below flag
- clip type
- clipper flag compositing graphics operations and flags, including
- the raster operation code
- the alpha channel operation code
- the "source pop" flag
- the "destination pop" flag
- the x—independent flag
- fill rule
- attributes and
- fill table index.

The contents of the table 530, where not used in the priority determination module 500 are passed as messages to each of the fill color determination module 600 for pixel generation, and to the pixel compositing module 700 for compositing operations. Preferably, the contents of the table 530 are obtained from the edge crossing messages. Alternatively, the static contents of the level activation table 530 may be pre-loaded before the receipt of the edge crossing messages.

The first edge crossing for scanline 35 (FIG. 9) is seen in FIG. 12A where for P=1 (priority level 1), the fill count is updated to the value of the edge according to the non-zero winding rule. Because there are no objects beneath, the "need-below" is level set at zero.

Because a previous state of the table 530 was not set, the arrays 510 and 508 remain not set and the priority encoder 514 is disabled from outputting a priority. This is interpreted by priority generation module 516 which outputs a count n=40 (pixels) for a "no object" priority (eg: P=0), being the first, blank, portion of the scanline 35.

Figure 12B:
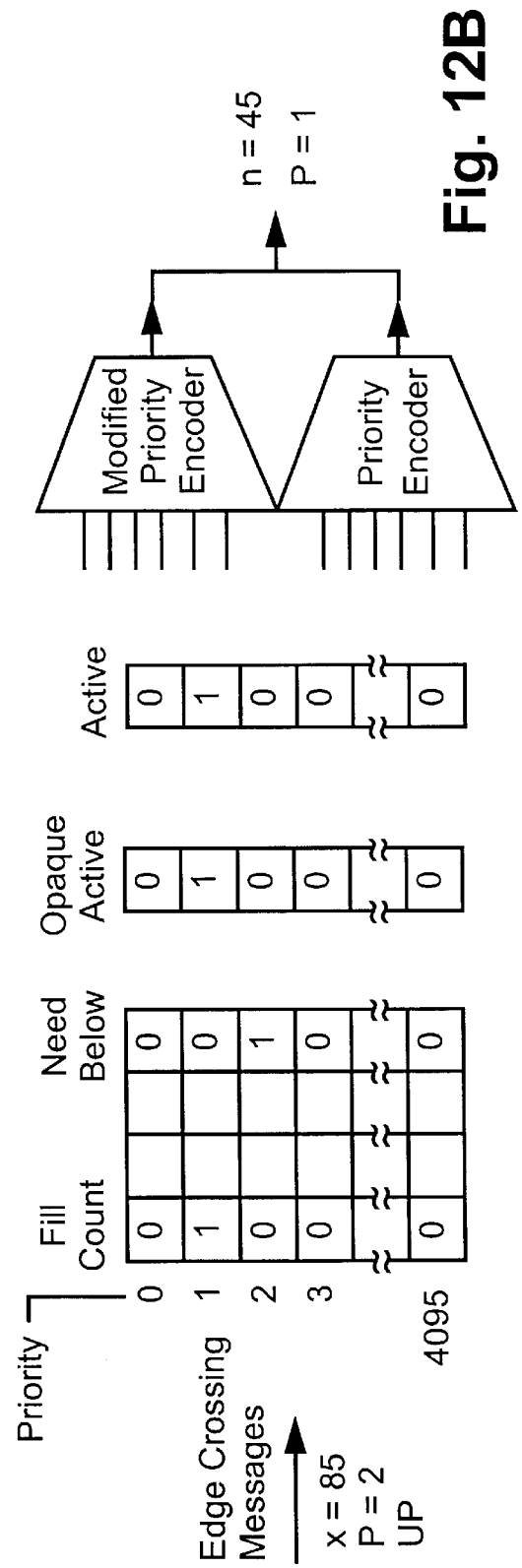

FIG. 12B shows the arrangement when the second edge crossing of (FIG. 9) is received. The fill count is updated. The arrays 510 and 508 are then set with the previous highest level from the table 530. At this time, the module 516 outputs a count n=45, P=1 representing the edge 96 of the opaque red object 90 before intersection with the semi-transparent triangle 80.

Figure 12C:
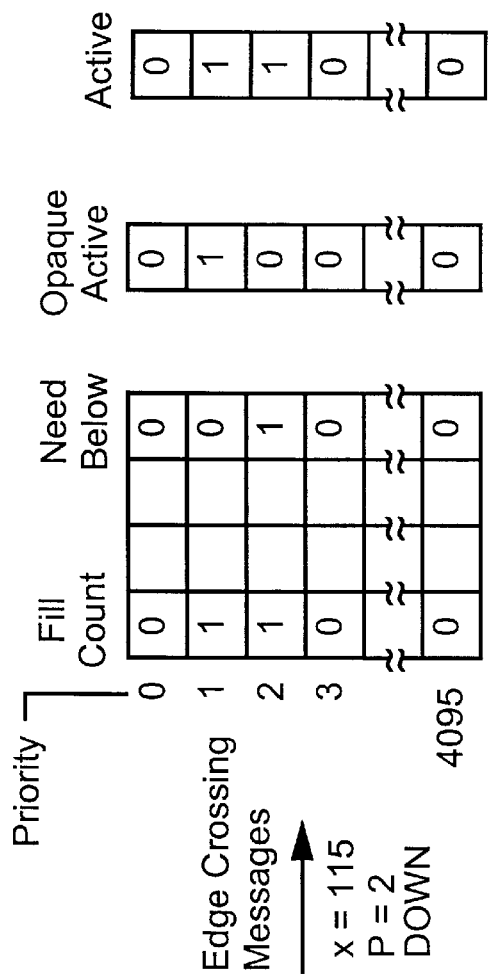
Figure 12C:
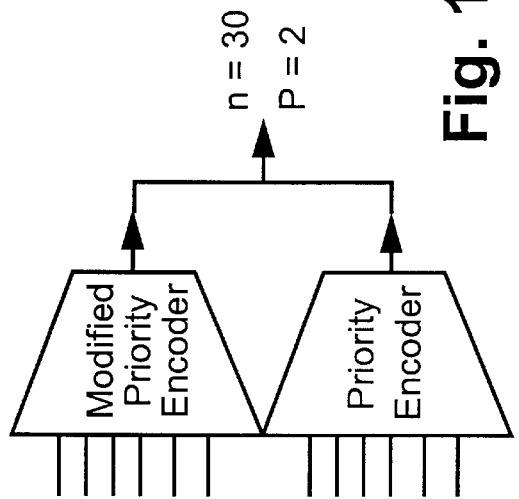

FIG. 12C shows the arrangement when the third edge crossing of scanline 35 of FIG. 9 is received. Note that the fill count has been adjusted downwardly because of the non-zero winding rule. Because the object that is valid prior to receiving the current edge crossing is not opaque, the modified priority encoder 512 is used to select the priority P=2 as the highest active level which is output as is current for n=(115–85)=30 pixels.

Figure 12D:
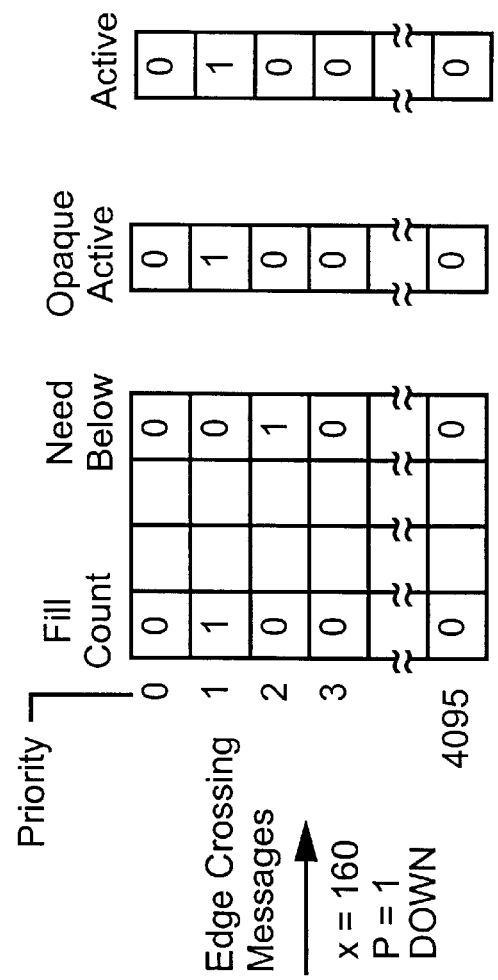
Figure 12D:
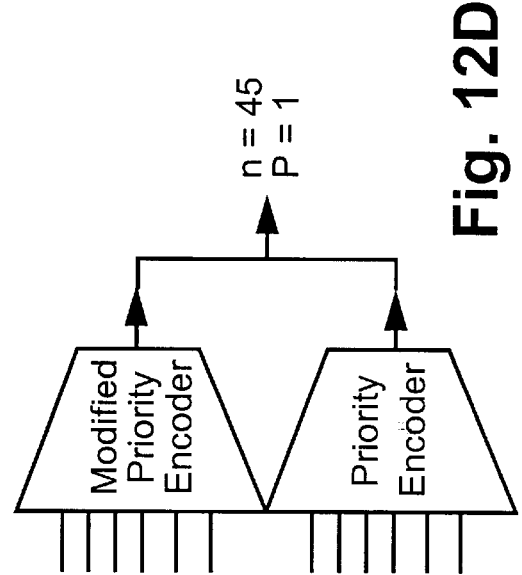

FIG. 12D shows the arrangement when the last edge crossing of FIG. 9 is received. Note that previously changed "need-below" for P=2 has been transferred to the active array 508, thus permitting the priority encoder to output a value P=1 current for n=(160–115)=45 pixels.

Figure 12E:
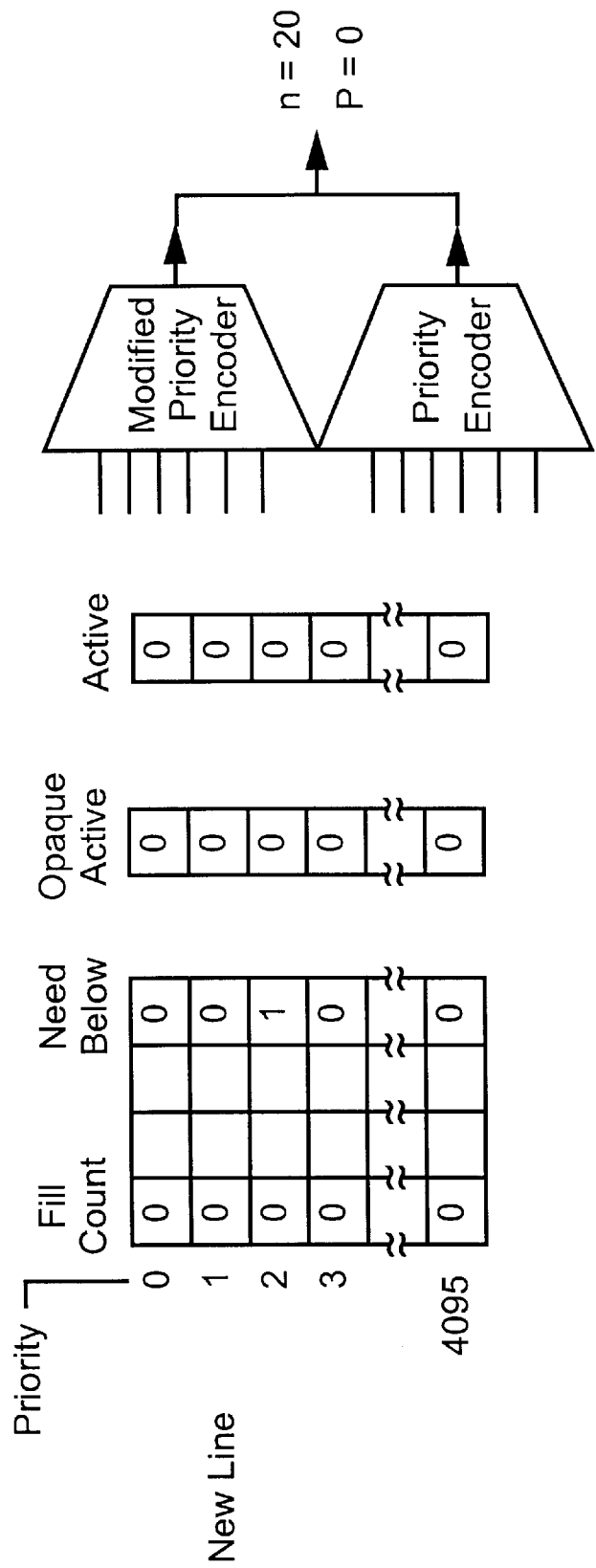

FIG. 12E shows the result when there is no more edge crossing is available, providing for an output of P=0 for n=(180–160)=20 pixels.

As such, the priority module 500 outputs counts of pixels and corresponding priority display values for all pixels of a scanline.

Figure 6:
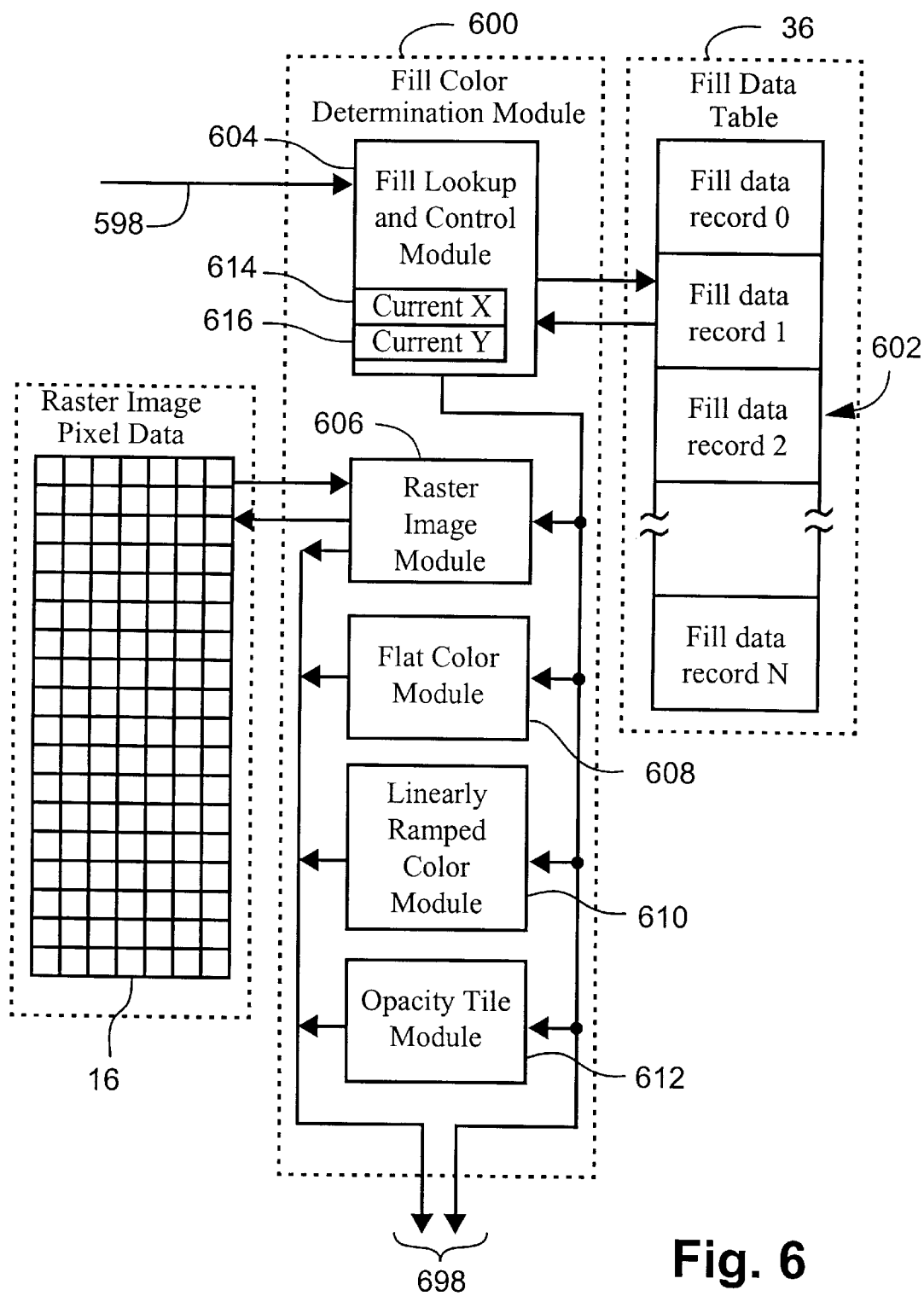
FIG. 6 is a schematic functional representation of the fill data determination module of FIG. 2.

The operation of the fill color determination module 600 will now be described with reference to FIG. 6. Incoming messages 598 from the priority determination module 500, which include set fill data messages, repeat messages, fill priority messages, end of pixel messages, and end of scanline messages, first pass to a fill lookup and control module 604. The fill lookup and control module 604 maintains a current X position counter 614 and a current Y position counter 616 for use by various components of the fill color determination module 600.

Upon receipt of an end of scanline message, the fill lookup and control module 604 resets the current X counter 614 to zero and increments the current Y counter 616. The end of scanline message is then passed to the pixel compositing module 700.

Upon receipt of a set fill data message, the fill lookup and control module 604 stores the data in the specified location 602 of the fill data table 36.

Upon receipt of a repeat message, the fill lookup and control module 604 increments the current X counter 614 by the count from the repeat message. The repeat message is then passed to the pixel compositing module 700.

Upon receipt of an end of pixel message, the fill lookup and control module 604 again increments the current X counter 614, and the end of pixel message is then passed to the pixel compositing module 700.

Upon receipt of a fill priority message, the fill lookup and control module 604 performs operations which include:
- the fill type from the fill priority message is used to select a record size in the table address from the fill priority message, and the record size as determined 36;
- the fill table above, is used to select a record from the fill data table 36;
- the fill type from the fill priority message is used to determine and select a sub-module to perform generation of the fill color. The sub-modules may include a raster image module 606 to deal with graphics, a flat color module 608, a linearly ramped color module 610, and an opacity tile module 612;
- the determined record is supplied to the selected sub-module 606–612; the selected sub-module 606–612 uses the supplied data to determine a color and opacity value;
- the determined color and opacity is combined with remaining information from the fill color message, namely the raster operation code, the alpha channel operation code, the source pop flag, and the destination pop flag, to form a color composite message, which is sent to the pixel compositing module 700 via the connection 698.

The pixel color components are a red, green, blue and opacity quadruple with 8-bit precision in the usual manner giving 32 bits per pixel. However, a cyan, magenta, yellow and black quadruple with an implied opacity, or one of many other known color representations may also alternatively be used.

The operation of the pixel compositing module 700 will now be described. Incoming messages from the fill color determination module 600, which include repeat messages, color composite messages, end of pixel messages, and end of scanline messages are processed in sequence.

Upon receipt of a repeat message or an end of scanline message, the pixel compositing module 700 forwards the message to a pixel output FIFO 702 without further processing.

Upon receipt of a color composite message the pixel compositing module 700 typically, and in general terms combines the color and opacity from the color composite message with a color and opacity popped from the pixel compositing stack 38 according to the raster operation and alpha channel operation from the color composite message. It then pushes the result back onto the pixel compositing stack 38. A description of the processing performed upon of receipt of a color composite message is given below.

Upon receipt of an end of pixel message, the pixel compositing module 700 pops a color and opacity from the pixel compositing stack 38, with the exception that if the stack 38 is empty an opaque white value is used. The resultant color and opacity is formed into an pixel output message which is forwarded to the pixel output module 800.

The operation of the pixel output module 800 will now be described. Incoming messages are read from the pixel output FIFO, which include pixel output messages, repeat messages, and end of scanline messages are processed in sequence.

Upon receipt of a pixel output message the pixel output module 800 stores the pixel and also forwards the pixel to its output. Upon receipt of a repeat message the last stored pixel is forwarded to the output 898 as many times as specified by the count from the repeat message. Upon receipt of an end of scanline message the pixel output module 800 passes the message to its output.

The output 898 may connect as required to any device that utilizes pixel image data. Such devices include output devices such as video display units or printers, or memory storage devices such as hard disk, semiconductor RAM including line, band or frame stores, or a computer network. However, as will be apparent from the foregoing, a method and apparatus are described that provide for the rendering of graphic objects with full functionality demanded by sophisticated graphic description languages without a need for intermediate storage of pixel image data during the rendering process.

Figure 13A:
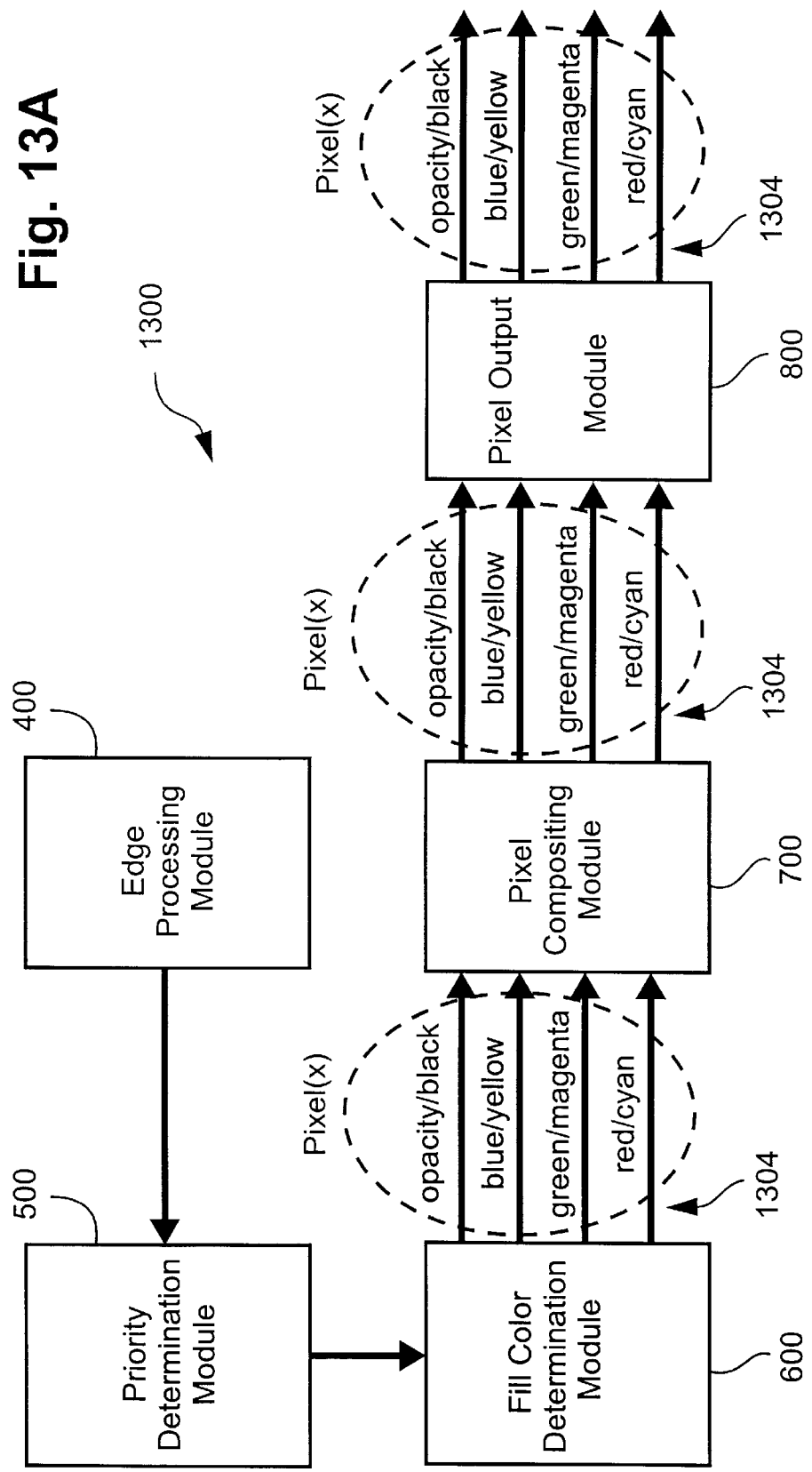
FIGS. 13A and 13B illustrate the functional data flow of the pixel sequential rendering apparatus during a color operating mode and a grey-scale operating mode.
Figure 13B:
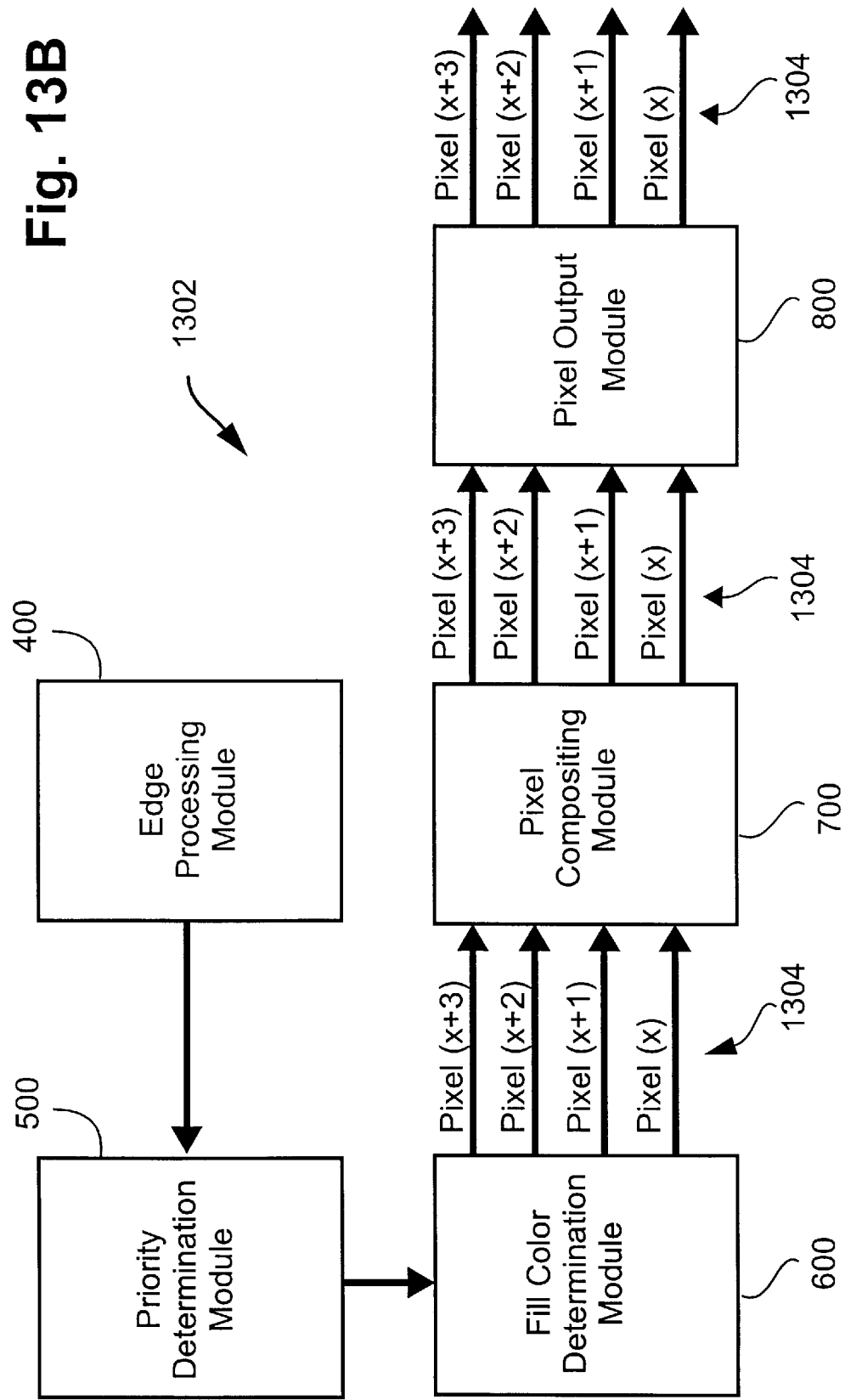

Turning now to FIGS. 13A and 13B, there are shown data flow of the pixel sequential rendering apparatus 20, when operating under a color operating mode 1300 and a grey-scale operating mode 1302 respectively. The instruction executor 300 in response to instructions from the host processor 2 instructs the Priority Determination Module 500, the Fill Color Determination Module 600, the Pixel Compositing Module 700, and the Pixel Output Module 800 to operate in either the color operating mode or the grey-scale operating mode.

During the color operating mode, the Fill Color Determination 600, Pixel Compositing Module 700, and Pixel Output Module 800 output color pixel data having four pixel components on four output channels 1304 respectively. The output channels 1304 preferably comprise a bus (24 or 32-bit wide). The color pixel data is divided into its color components, for example Red, Green, Blue, and with or without an opacity component, or for example Cyan, Magenta, Yellow and Black components. These color components preferably consist of 8-bits each and are output on the respective four output channels 1304. During the color operating mode, the Fill Color Determination 600, Pixel Compositing Module 700, and Pixel Output Module 800 output on the four output channels 1304 one pixel per clock cycle in a synchronous manner.

During the grey scale rendering mode, the Fill Color Determination 600, Pixel Compositing Module 700, and Pixel Output Module 800 output pixel data having only a grey-scale pixel component of 8-bits on the four output channels 1304. During this mode, the Fill Color Determination 600, Pixel Compositing Module 700, and Pixel Output Module 800 output upto four consecutive pixels in raster order on the respective four output channels 1304 per clock cycle in a synchronous manner.

The color pixel sequential rendering apparatus 20 accelerates grey scale rendering in two different ways. The Priority Determination Module 500 generates a repeat command and a fill command for the color operating mode, the operations of which commands are modified for the accelerated grey scale operating mode so as to accelerate the grey scale rendering.

The details and operations of these two commands, fill and repeat command are discussed below for the color operating mode:

The repeat command is generated by the Priority Determination module 500 with one parameter. This parameter specifies the number of pixels that have the same pixel data, and this command is passed on to all the downstream modules all the way up to Pixel Output Module 800. Once this command has been processed and completed by the downstream modules for the specified pixel locations, these downstream modules will then proceed to the next pixel location.

The fill command, during the color operating mode, has a number of parameters such as, an object identifier, the type of fill, fill address, compositing operation, pixel attribute and a flag (last_object) to indicate whether the object is the last object for this pixel, ie. the top most object of all the objects active for this pixel. This command must be translated by Fill Color Determination Module 600 to obtain the color of each object contributing to the current pixel location being processed. Where the last_object flag has been set to TRUE for a fill command and that fill command has been processed by the Fill Color Determination Module 600 for the current pixel location, the Fill Color Determination Module 600 will then proceed to the next pixel location for processing. If the last_object flag has been set to FALSE, however, the Fill Color Determination Module 600 will continue to process the current pixel location.

The repeat command is created when one or more subsequent pixels following the current one have x-coordinate independent object(s), for example object(s) with color fill of flat color or linear ramp color in y-direction. Under these circumstances, the Fill Color Determination module 600 only needs to work out the fill command for the leading pixel and then pass on the repeat command afterwards to all the downstream modules. The number of pixels to be repeated depends on the next edge crossing X" coordinate that Pixel Determination module 500 receives and the X co-ordinate of the current edge crossing. Namely, the parameter of the repeat command will be equal to (X"-(X+1)).

In a case where one or more object has bitmap or any other color fill operation that has potentially different color data for every pixel, Priority Determination module 500 has no choice except to send a fill command for every pixel the object(s) is/are active. In return, the Fill Color Determination module 600 works out the final pixel color for every pixel.

Figure 14:
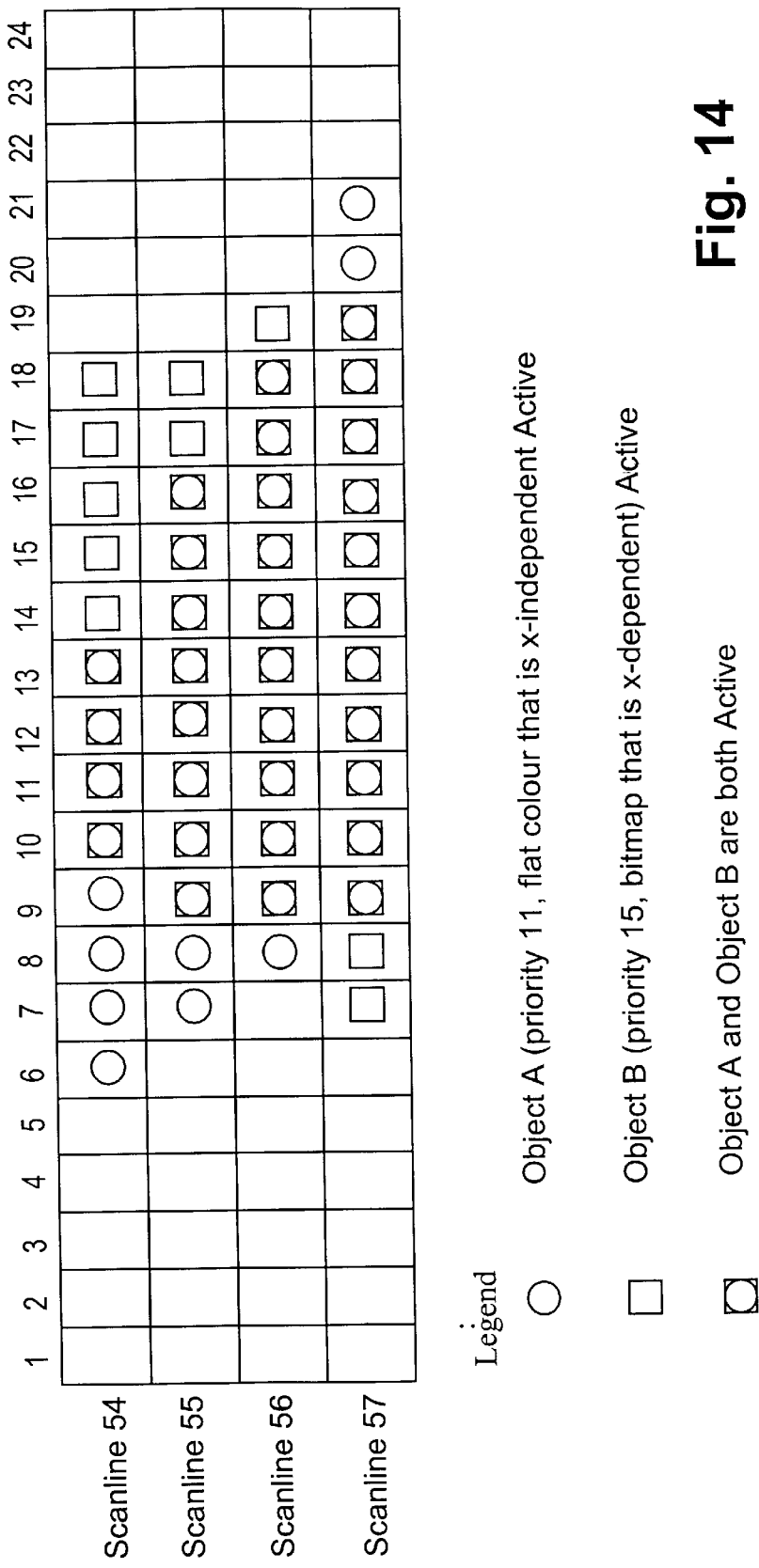
FIG. 14 represents a number of scanlines of an exemplary image, which representation comprises a plurality of objects.

Turning now to FIG. 14, there is illustrated a representation of an exemplary image, which representation comprises a plurality of objects. Object A has left edge crossings at the pixel locations, 6, 7, 8, and 9 for scan lines 54, 55, 56, and 57 respectively. The object A has also right edge crossings at the pixel locations 13, 16, 18, and 21 for scan lines 54, 55, 56, and 57 respectively. Object B has left edge crossings at the pixel locations, 10, 9, 9, and 7 for scan lines 54, 55, 56, and 57 respectively. The object B has also right edge crossings at the pixel locations 18, 18, 19, and 19 for scan lines 54, 55, 56, and 57 respectively. Object A has a flat color that is independent of the pixel location in the x-direction, ie. x-independent. Object B, on the other hand, is a bitmap where the pixels are x-dependent. Object A and Object B are active in common for the following pixels: scan line 54 pixels 10 to 13 inclusive; scan line 55 pixels 9 to 16 inclusive; scan line 56 pixels 9 to 18 inclusive; scan line 57 pixels 9 to 19 inclusive. As object B has a lower priority than object A, then object A is the top most object of all objects active for this pixel.

The commands, for the color operating mode, at the input 498 and output 598 of Priority Determination Module 500 for the first and last scan lines (54 and 57) of the example shown in FIG. 14 are:

scan line 54 (input commands):
1. edge_crossing: x=6; object=A; edge=UP; priority=11;
2. edge crossing: x=10; object=B; edge=UP; priority=15;
3. edge crossing: x=13; object=A; edge=DOWN; priority=11;
4. edge crossing: x=18; object=B; edge=DOWN; priority=15;

scan line 54 (output commands):
1. repeat 4
2. fill: object=A; type=flat; fill_address=20; last_object=true;
3. repeat 3
4. fill: object=B; type=bitmap; fill_address=32; last_object=false;
5. fill: object=A; type=flat; fill_address=20; last_object=true;
6. fill: object=B; type=bitmap; fill_address=32; last_object=false;
7. fill: object=A; type=flat; fill_address=20; last_object=true;
8. fill: object=B; type=bitmap; fill_address=32; last_object=false;
9. fill: object=A; type=flat; fill_address=20; last_object=true;
10. fill: object=B; type=bitmap; fill_address=32; last_object=false;
11. fill: object=A; type=flat; fill_address=20; last_object=true;
12. fill: object=B; type=bitmap; fill_address=32 last_object=true;
13. fill: object=B; type=bitmap; fill_address=32; last_object=true;
14. fill: object=B; type=bit map; fill_address=32; last_object=true;
15. fill: object=B; type=bitmap; fill_address=32; last_object=true;
16. fill: object=B; type=bitmap; fill_address=32; last_object=true;

a scan line 57 (input commands)
1. edge_crossing: x=7; object=B; edge=UP; priority=15;
2. edge crossing: x=9; object=A; edge=UP; priority=11;
3. edge crossing: x=19; object=B; edge=DOWN; priority=15;
4. edge crossing: x=21; object=A; edge=DOWN; priority=11;

scan line 57 (output commands):
1. repeat 5
2. fill: object=B; type=bitmap; fill_address=32; last_object=true;
3. fill: object=B; type=bitmap; fill_address=32; last_object=true;
4. fill: object=B; type=bitmap; fill_address=32; last_object=false;
5. fill: object=A; type=flat; fill_address=20; last_object=true;
6. fill: object=B; type=bitmap; fill_address=32; last_object=false;
7. fill: object=A; type=flat; fill_address=20; last_object=true;
8. fill: object=B; type=bitmap; fill_address=32; last_object=false;
9. fill: object=A; type=flat; fill_address=20; last_object=true;
10. fill: object=B; type=bitmap; fill_address=32; last_object=false;
11. fill: object=A; type=flat; fill_address=20; last_object=true;
12. fill: object=B; type=bitmap; fill_address=32; last_object=false;
13. fill: object=A; type=flat; fill_address=20; last_object=true;
14. fill: object=B; type=bitmap; fill_address=32; last_object=false;
15. fill: object=A; type=flat; fill_address=20; last_object=true;
16. fill: object=B; type=bitmap; fill_address=32; last_object=false;
17. fill: object=A; type=flat; fill_address=20; last_object=true;
18. fill: object=B; type=bitmap; fill_address=32; last_object=false;
19. fill: object=A; type=flat; fill_address=20; last_object=true;
20. fill: object=B; type=bitmap; fill_address=32; last_object=false;
21. fill: object=A; type=flat; fill_address=20; last_object=true;
22. fill: object=B; type=bitmap; fill_address=32; last_object=false;
23. fill: object=A; type=flat; fill_address=20; last_object=true;
24. fill: object=B; type=bitmap; fill_address=32; last_object=false;
25. fill: object=A; type=flat; fill_address=20; last_object=true;
26. fill: object=A; type=flat; fill_address=20; last_object=true;
27. repeat 1;

As mentioned previously, the edge crossing messages (input commands) may contain further parameters, for example see the description in relation to FIG. 12A. For sake of simplicity only a few of these parameters are shown in relation to FIG. 14.

The fill_address parameter is used by Fill Color Determination module to work out the color value associated with this particular object. For every fill command passed on to Fill Color Determination module 600 corresponding color data is generated either in the format of RGBO or CMYK.

During the grey scale operating mode, both the Priority Determination and Fill Color Determination modules work in resolution of up to 4 pixels per fill command, so as to make efficient use of the four output channels. This improves the grey-scale rendering speed by up to 4 times than by using only one output channel for the grey scale rendering.

The Priority Determination module 500 operates in a similar fashion during the grey scale rendering and color operating modes, when encountering an x-independent region, in that is it still issues a fill command followed by repeat. In this case, the Fill Color Determination Module 600 and the Pixel Compositing Module 700 need only output one pixel on one output channel 1304 followed by a repeat command. However, it is desirable that the Pixel Output module 800 output all the pixel data for subsequent use by the pixel output device 10, rather than using a repeat command. In addition, it is preferable that the Pixel Output Module 800, during the grey-scale operating mode, simultaneously delivers up to four pixels on the four output channels respectively. During the grey-scale operating mode, the Pixel Output Module 800 upon receipt of one pixel and then a repeat command will simultaneously deliver an appropriate number of pixels on up to four of the respective output channels 1304. If there are more than four pixels then the repeat command will cause groups of four pixels to be output sequentially. The repeat command causes the pixels to be output on the channels in a predetermined order. For example, the pixels are output in the following order: the lowest channel, the next lowest channel, and so on to the top most channel. Thus, when a repeat command delivers two pixels, these pixels will be simultaneously output on the lowest channel and the next lowest channel. As the amount of pixels to be repeated will not always be a multiple of four, the Pixel Ouput Module 800 also supplies output signals to indicate the number of valid channels during the delivery cycle of the Pixel Output Module 800. In the latter example, these signals would indicate that the bottom two channels were valid, whereas the top two channels were invalid.

In the case of x-dependent region, which is normally caused by the presence of bitmap data, the Priority Determination Module during grey scale rendering sends a single fill command for up to four pixels. This is achieved by a further parameter of the Fill command called 'no_pixel' which identifies the number of consecutive pixels in raster order to which the Fill command applies. The number of pixels that can be represented into a single fill command depends on the remaining number of pixels before the next edge crossing. If the next edge crossing happens at more than 4 pixels away from the current x-position being rendered, then the fill command issued is valid for 4 pixels. Another Fill command will need to be issued for the remaining pixels. Otherwise the number of valid pixels in the fill command is simply the remaining number of pixel prior to the edge crossing. Moreover, the fill command causes the pixels to which the fill command applies to be output on the output channels 1304 in a predetermined order. For example, the pixels are output in the following order: the lowest channel, the next lowest channel, and so on to the top most channel. Thus, when a fill command parameter 'no_pixel'=2, the corresponding two pixels will be simultaneously output on the lowest channel and the next lowest channel.

The Fill Color Determination module 600 then works out the resultant color for every valid pixel in a given fill command simultaneously. This is possible, as the bitmap data for adjacent pixels is normally stored in an adjacent address space in the local memory. Furthermore, Fill Color Determination module 600 usually fetches more than one pixel worth of data from the local memory in order to improve the performance.

The Fill Color Determination module 600 is also capable of generating multiple "color composite messages" as a result of single fill command with multiple pixels. This is useful as the cache may contain only part of the multiple pixel's bitmap data and as a result they need to be fetched from local memory first, which is usually quite slow. In this situation, the module sends a first color composite message to downstream module with modified pixel validity values. When subsequent pixel data is available, the second message is generated for the remaining pixel location from the same fill command.

Further downstream, the operation of Pixel Compositing Module 700 does not change and can simply perform the compositing operation for all the available channels irrespective whether the channels contains a valid pixel or not in the case of grey-scale rendering. However, the Pixel Output module 800 may want to do a bit of house keeping in ensuring that the valid pixel will always start from the bottom channel to simplify the operation of pixel data buffering.

Returning to FIG. 14 again, the commands at the input and output of Priority Determination Module 500 for the first and last scanlines (54 and 57) in the case of accelerated grey-scale rendering, viz the grey-scale operating mode, are shown:

scan line 54 (input commands):
1. edge_crossing: x=6; object=A; edge=UP; priority=11;
2. edge crossing: x=10; object=B; edge=UP; priority=15;
3. edge crossing: x=13; object=A; edge=DOWN; priority=11;
4. edge crossing: x=18; object=B; edge=DOWN; priority=15;

scan line 54 (output commands):
1. repeat 4
2. fill: object=A; type: flat; fill_address=20; last_object=true; no_pixel=1;
3. repeat 3
4. fill: object=B; type=bitmap; fill_address=32; last_object=false; no_Pixel=4;
5. fill: object=A; type=flat; fill_address=20; last_object=true; no_pixel=4;
6. fill: object=B; type=bitmap; fill_address=32; last_object=true; no_pixel=4;
7. fill: object=B; type=bitmap; fill_address=32; last_object=true; no_pixel=1;
8. scan line 57 (input commands)
1. edge_crossing: x=7; object=B; edge=UP; priority=15;
2. edge crossing: x=9; object=A; edge=UP; priority=11;
3. edge crossing: x=19; object=B; edge=DOWN; priority=15;
4. edge crossing: x=21; object=A; edge=DOWN; priority=11;

scan line 57 (output commands):
1. repeat 5
2. fill: object=B; type: bitmap; fill_address=32; last_object=true; no_pixel=2;
3. fill: object=B; type: bitmap; fill_address=32; last_object=false; no_pixel=4;
4. fill: object=A; type: flat; fill_address=20; last_object=true; no_pixel=4;
5. fill: object=B; type: bitmap; fill_address=32; last_object=false; no_Pixel=4;
6. fill: object=A; type: flat; fill_address=20; last_object=true; no_pixel=4;
7. fill: object=B; type: bitmap; fill_address=32; last_object=false; no_Pixel=3;
8. fill: object=A; type: flat; fill_address=20; last_object=true; no_pixel=3;
9. fill: object=A; type: flat; fill_address=20; last_object=true; no_pixel=1;
10. repeat 1;

The improvement in performance can clearly be seen from the examples on the two given scan lines. In the two scan lines (54 and 57), the number of fill commands are reduced from 14 to 5 and 25 to 8 respectively, a very significant enhancement.

The following tables show the Pixel Output module behaviour in color and grey-scale rendering for the first 3 commands in scan line 54 of the given example above. Note that for color rendering channels 3, 2, 1 and 0 act as opacity, blue, green and red channels respectively.

TABLE A

Color operating Mode

| Command | Time | Ch 3 | Ch 2 | Ch 1 | Ch 0 | Comment |
|---|---|---|---|---|---|---|
| Repeat 5 | 0 | FF | FF | FF | FF | By default, white color is used when there is no object, pixel x = 1 |
|  | 1 | FF | FF | FF | FF | Pixel x = 2 |
|  | 2 | FF | FF | FF | FF | Pixel x = 3 |
|  | 3 | FF | FF | FF | FF | Pixel x = 4 |
|  | 4 | FF | FF | FF | FF | Pixel x = 5 |
| fill: object = A; type = flat; fill_address = 20; last_object = true; | 5 | FF | 00 | 00 | FF | The fill command is translated by Fill Color Determination module and then by Pixel Compositing module to form the final color. In this case, it is assumed to be Red. Pixel x = 6 |
| Repeat 9 | 6 | FF | 00 | 00 | FF | Pixel x = 7 |
|  | 7 | FF | 00 | 00 | FF | Pixel x = 8 |
|  | 8 | FF | 00 | 00 | FF | Pixel x = 9 |

TABLE B

Grey scale operating mode

| Command | Time | Ch 3 | Ch 2 | Ch 1 | Ch 0 | Comment |
|---|---|---|---|---|---|---|
| Repeat 5 | 0 | FF | FF | FF | FF | By default, white color is used when there is no object, pixel x = 1 to 4, with ch. 1 represents pixel x = 1 and ch. 4 represents pixel x = 4. |
|  | 1 | — | — | — | FF | pixel x = 5 is output on Ch. 0 |
| Fill: object = A; type = flat; fill_address = 20; last_object = true; no_pixel = 1 | 2 | — | — | — | AA | The fill command is translated by Fill Color Determination module and then by Pixel Compositing module to form the final color. In this case, it is assumed to be AA in grey-scale value. pixel x = 6 is output on Ch. 0. |
| Repeat 9 | 3 | — | AA | AA | AA | pixel x = 7 is output on Ch. 0, pixel x = 8 is output on Ch. 1, and pixel x = 9 is output on Ch. 2 |

A method of operating the pixel rendering sequential rendering apparatus 20 will now be described with reference to the flow charts shown in FIGS. 15, and 16. The method is able to configure the Fill Color Determination Module 600, the Pixel Compositing Module 700, and the Pixel Output Module 800 to operate in a color operating mode or an accelerated grey scale operating mode. The method is configured to operate in one of these modes in response to instructions received from the host processor via the instruction executor 300. In both of these modes the method generates commands for each one of the Fill Color Determination, the Pixel Compositing, and the Pixel Output Modules 600, 700, 800. These commands although substantially similar are mode dependent. The method when operating in a color operating mode will in response to the color operating mode commands output four pixel components of one pixel at a time on the four output channels 1304 respectively of the Fill Color Determination, the Pixel Compositing, and the Pixel Output Modules 600, 700, 800. The method when operating in an accelerated grey scale operating mode will in response to the grey scale operating mode commands output upto four consecutive pixels in raster order on the respective four output channels 1304 of the Fill Color Determination, the Pixel Compositing, and the Pixel Output Modules 600, 700, 800 per clock cycle in a synchronous manner.

Figure 15:
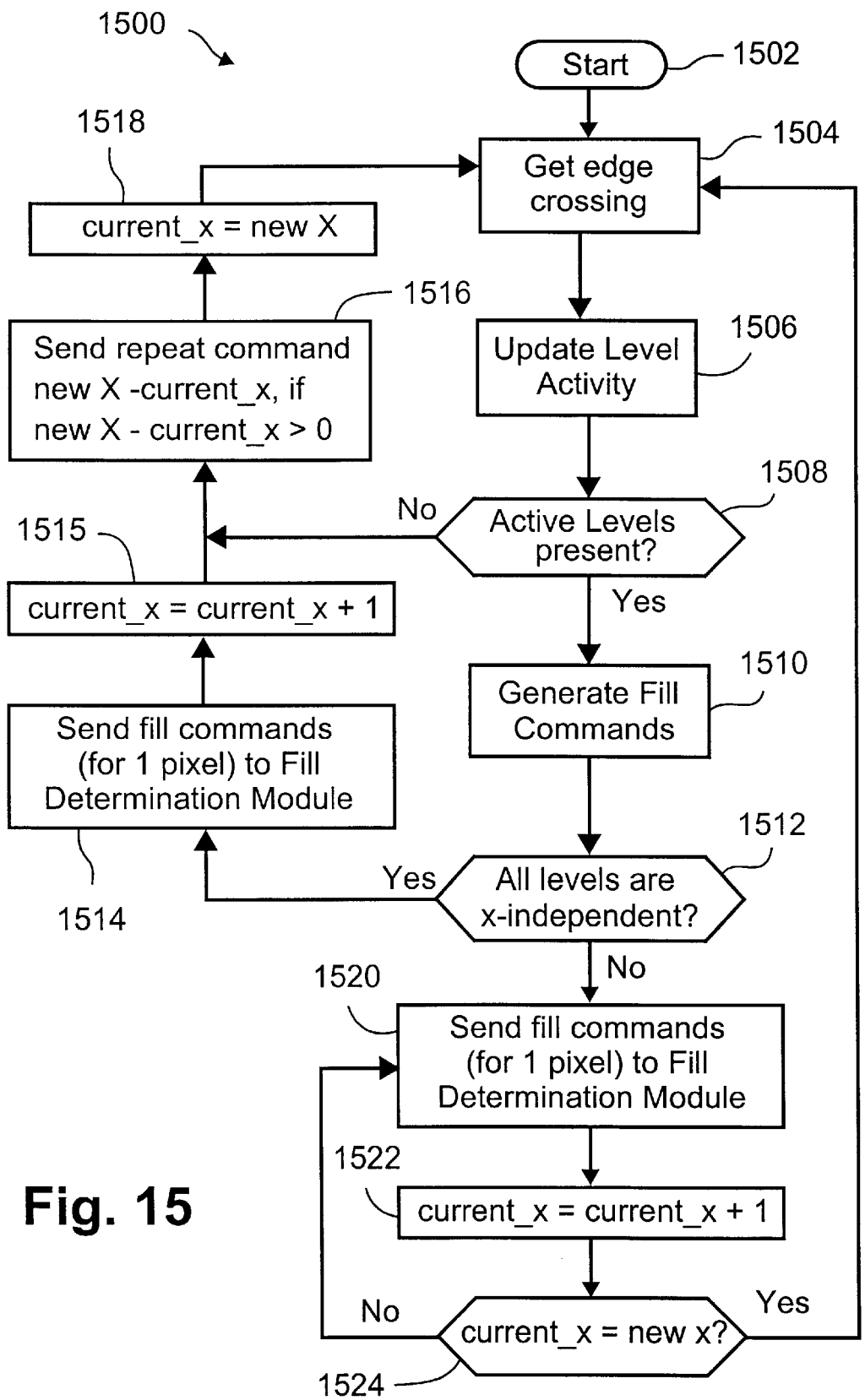
FIG. 15 shows a flow chart of a method of generating commands when operating in the color operating mode.

Turning now to FIG. 15, there is shown a flow chart of a method of generating commands when operating in the color operating mode. The method 1500 of generating commands is performed for each scanline of the image to be rendered. For ease of explanation, the method is described with reference to generating commands for one scanline only, herein called the currently scanned scanline.

The method 1500 commences 1502 at a currently scanned scanline by setting a variable current_x to one, which variable acts as a counter indicating the position of the current pixel under consideration. As mentioned previously, the edge crossing messages (input commands) are forwarded to the priority determination module 500 via the FIFO 518 in order of scanline intersection (X) co-ordinates. The method 1500 processes these edge crossing messages in order of their scanline intersection (X) co-ordinates. These edge crossing messages may take the format as described with reference to FIG. 14, such as edge_crossing: x=6; object=A; edge=UP; priority=11 and other fields.

The method 1500 is in the form of a loop (1504-1512-1504, 1504-1524-1504) where the edge crossing messages are retrieved 1504 and processed during respective passes of the loop in order of their scanline intersection (X) co-ordinates. If there are a plurality of edge crossing messages having the same scanline intersection co-ordinate (X), the method retrieves 1504 all of these plurality of edge crossing messages for processing during one pass of the loop. In other words, during a current pass of the loop, the method 1500 gets 1504 one or more edge crossing messages having the same (X) co-ordinate which are next in scanline order after the (X) co-ordinate of those edge crossing message(s) retrieved during the last previous pass of the loop.

After the commencement step 1502, the method 1500 gets 1504 the edge crossing message(s) having a scanline intersection co-ordinate (X) which occurs first in scanline order. If there are a plurality of edge crossing messages having the same intersection (X) co-ordinate all occurring first in the scanline order, the method gets 1504 all of these first edge crossing messages. The method 1500 also updates the level activation table 530 using the currently retrieved edge crossing message(s) for the current X co-ordinate in the manner described previously. In the event the (X) co-ordinate of the first edge crossing message(s) is greater than two, the method 1500 also sends a command "repeat X−2" to the Fill Color Determination Module 600, Pixel Compositing Module 700, and Pixel Output Module 800. Preferably, the latter repeat command has a flag set ON indicating that there is no objects spanning pixels X=1 through to X−1 and a background may be painted at these locations.

After step 1504, the method 1500 then updates 1506 the "active flags" and "opaque active flags" stored in flag tables 508 and 510 utilizing said currently retrieved edge crossing message(s). The manner in which the "active flags" and "opaque active flags" are updated is described above in more detail.

The method 1500 then determines 1508 whether there are any priority objects which have their "active flags" set ON for the pixel located at the current value of current_x. If all of these one or more objects have their associated "active flags" set OFF, they make no contribution to the current pixel, and the decision block 1508 returns FALSE (no) and method 1500 proceeds to step 1516.

The method 1500 then sends 1516 a command "repeat (new_X−current_x)", if (new_X−current_x)>0, where new_X is the value of the X co-ordinate of the next edge crossing message(s) in scanline order and current_x is the current value of the variable current_x. In this case, the above-mentioned flag of the repeat command is set ON indicating that there is no objects spanning pixels located at current_x to new X and a background may be painted at these locations. The method then proceeds to step 1518.

During step 1518, the method 1500 sets the variable current_x to new_X, where new_X is equal to the X co-ordinate of the next edge crossing message(s) in scanline order. The method 1500 then returns to step 1504, where the method 1500 then gets 1504 the next edge crossing message (s) which have an edge crossing at new_X for processing during the next pass of the loop.

On the other hand, if any one of the "active flags" of the objects are flagged ON for the pixel located at the current value of current_x, the decision block 1508 returns TRUE (yes) and the method 1500 proceeds to step 1510.

During step 1510, the method 1500 commences generating fill commands for the pixel located at the current value of current_x. The method 1500 during this step 1510 determines in priority order those objects having a "active flag" set ON which have the same or lower priority than that object having a "active flag" set ON and the highest "active opaque flag" set ON. The data for the parameters of these fill commands is obtained indirectly from the information contained in the edge messages retrieved so far. In particular, the parameters for the fill commands are obtained from the updated level activation table 530 for the current value of current_x. During this generation step 1510, the method 1500 also prioritizes the fill commands, if there are more than one fill commands for the pixel located at the current value of current_x. Namely, the fill commands for the pixel located at the current value of current_x are generated in order of their object priority. It should be noted that this generating step 1510 generates one or more fill commands for one pixel only. These fill commands (output commands) may take the format as described previously with reference to FIG. 14. For example, the fill commands for one pixel may be; fill: object=B; type=bitmap; fill_address=32; last_object=false; fill: object=A; type=flat; fill_address=20; last_object=true. The parameter last_object=true is indicative that this fill command is the last fill command for the current pixel. Preferably, the fill command for an object also includes a x-independent flag (eg type). As mentioned earlier, this flag indicates whether or not the color of this active object is constant for a given Y (ie scanline).

After the generating step 1510, the method 1500 then determines 1512 whether the objects associated with the previously generated fill commands are x-independent with reference to the type parameter.

In the event the decision block 1512 determines all objects associated with the previously generated fill commands are x-independent, the method 1500 then sends 1514 these previously generated fill commands to the Fill Color Determination Module 600, Pixel Compositing Module 700, and Pixel Output Module 800. After step 1514, the method 1500 increments 1515 the variable current_x by one and proceeds to step 1516.

The method 1500 then sends 1516 a command "repeat (new_X−current_x)", if (new_X−current_x)>0, where new_X is the value of the X co-ordinate of the next edge crossing message(s) in scanline order and current_x is the current value of the variable current_x. In this case, the above-mentioned flag of the repeat command is set OFF. This indicates that the fill commands for the current value of current_x are to be repeated for subsequent locations. The method then proceeds to step 1518. However, if the value new_X−current_x is equal to zero then a repeat command is not sent and the method proceeds directly to step 1518.

The method 1500 then sets 1518 the variable current_x to the value of new_X, and returns to step 1504 for processing of the next edge crossing message(s), which have an edge crossing at new_X, during the next pass of the loop.

On the other hand, if the decision block 1512 determines that one or more objects of the previously generated fill commands are x-dependent, the method 1500 then proceeds to step 1520. The latter may occur, if for example one of the objects is a bitmap. Namely, in the event the decision block 1512 returns FALSE (No), then the method 1500 sends 1520 the fill commands (output commands) for the pixel located at current_x to be sent to the Fill Color Determination Module 600, Pixel Compositing Module 700, and Pixel Output Module 800.

After the sending step 1520, the method 1500 increments 1522 the variable current_x by one and proceeds to decision block 1524.

During decision block 1524, the method 1500 checks whether the current value of the variable current_x is equal to new_X, where new_X is the X co-ordinate of the next edge crossing message(s) to be processed in scanline order. If decision block 1524 determines that the current value of current_x is not equal to new_X, then the method 1500 returns to step 1520. The step 1520 then sends the same fill commands again, as were sent during the previous pass of step 1520, for the pixel located at the new value for current_x.

On the other hand, if the decision block 1524 returns TRUE (yes), the method 1500 returns to step 1504 for processing the next edge crossing message(s) during the next pass of the loop.

The method 1500 terminates (not shown) for the current scanline once there are no more edge crossing messages to be processed.

Figure 16:
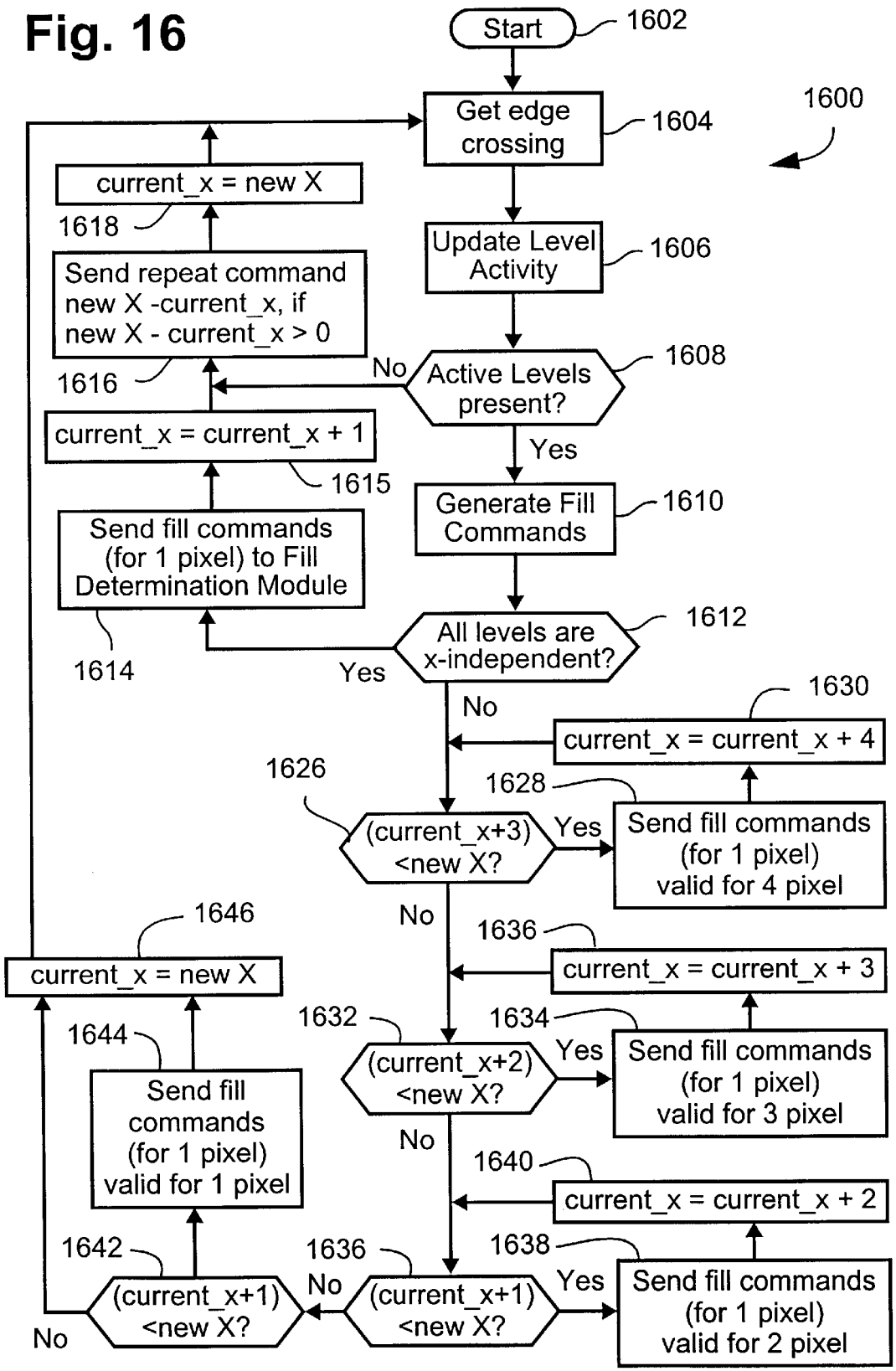
FIG. 16 shows a flow chart of a method of generating commands when operating in an accelerated grey scale operating mode.

Turning now to FIG. 16, there is shown a flow chart of a method of generating commands when operating in the grey scale operating mode. The method 1600 of generating commands is performed for each scanline of the image to be rendered. For ease of explanation, the method is described with reference to generating commands for one scanline only, herein called the currently scanned scanline.

The method 1600 commences 1602 at a currently scanned scanline by setting a variable current_x to one, which variable acts as a counter indicating the position of the current pixel under consideration. As mentioned previously, the edge crossing messages (input commands) are forwarded to the priority determination module 500 via the FIFO 518 in order of scanline intersection (X) co-ordinates. The method 1600 processes these edge crossing messages in order of their scanline intersection (X) co-ordinates. These edge crossing messages may take the format as described with reference to FIG. 14, such as edge_crossing: x=6; object=A; edge=UP; priority=11 and other fields.

The method 1600 is in the form of a loop (1604-1612-1604, 1604-1642-1604) where the edge crossing messages are retrieved 1604 and processed during respective passes of the loop in order of their scanline intersection (X) co-ordinates. If there are a plurality of edge crossing messages having the same scanline intersection co-ordinate (X), the method retrieves 1604 all of these plurality of edge crossing messages for processing during one pass of the loop. In other words, during a current pass of the loop, the method 1600 gets 1604 one or more edge crossing messages having the same (X) co-ordinate which are next in scanline order after the (X) co-ordinate of those edge crossing message(s) retrieved during the last previous pass of the loop.

After the commencement step 1602, the method 1600 gets 1604 the edge crossing message(s) having a scanline intersection co-ordinate (X) which occurs first in scanline order. If there are a plurality of edge crossing messages having the same intersection (X) co-ordinate all occurring first in the scanline order, the method gets 1604 all of these first edge crossing messages. The method 1600 also updates the level activation table 530 using the currently retrieved edge crossing message(s) for the current X co-ordinate in the manner described previously. In the event the (X) co-ordinate of the first edge crossing message(s) is greater than two, the method 1600 also sends a command "repeat X−2" to the Fill Color Determination Module 600, Pixel Compositing Module 700, and Pixel Output Module 800. An initial repeat command indicates that there is no object spanning pixels X=1 through to X−1. Preferably, the latter repeat command has a flag set ON indicating that there is no objects spanning pixels X=1 through to X−1 and a background may be painted at these locations.

After step 1604, the method 1600 then updates 1606 the "active flags" and "opaque active flags" stored in flag tables 508 and 510 utilizing said currently retrieved edge crossing message(s). The manner in which the "active flags" and "opaque active flags" are updated is described above in more detail.

The method 1600 then determines 1608 whether there are any priority objects which have their "active flags" set ON for the pixel located at the current value of current_x. If all of these one or more objects have their associated "active flags" set OFF, they make no contribution to the current pixel, and the decision block 1608 returns FALSE (no) and method 1600 proceeds to step 1616.

The method 1600 then sends 1616 a command "repeat (new_X−current_x)", if (new_X−current_x)>0, where new_X is the value of the X co-ordinate of the next edge crossing message(s) in scanline order and current_x is the current value of the variable current_x. In this case, the above-mentioned flag of the repeat command is set ON indicating that there is no objects spanning pixels located at current_x to new X and a background may be painted at these locations. The method then proceeds to step 1618. However, if the value new_X−current_x is equal to zero then a repeat command is not sent and the method proceeds directly to step 1618.

During step 1618, the method 1600 sets the variable current_x to new_X, where new_X is equal to the X co-ordinate of the next edge crossing message(s) in scanline order. The method 1600 then returns to step 1604, where the method 1600 then gets 1604 the next edge crossing message (s) which have an edge crossing at new_X for processing during the next pass of the loop.

On the other hand, if any one of the "active flags" of the objects are flagged ON for the pixel located at the current value of current_x, the decision block 1608 returns TRUE (yes) and the method 1600 proceeds to step 1610.

During step 1610, the method 1600 commences generating fill commands for the pixel located at the current value of current_x. The method 1600 during this step 1610 determines in priority order those objects having a "active flag" set ON which have the same or lower priority than that object having a "active flag" set ON and the highest "active opaque flag" set ON. The data for the parameters of these fill commands is obtained indirectly from the information contained in the edge messages retrieved so far. In particular, the parameters for the fill commands are obtained from the updated level activation table 530 for the current value of current_x. During this generation step 1610, the method 1600 also prioritizes the fill commands, if there are more than one fill commands for the pixel located at the current value of current_x. Namely, the fill commands for the pixel located at the current value of current_x are generated in order of their object priority. It should be noted that this generating step 1610 generates one or more fill commands for one pixel only. These fill commands (output commands) may take the format as described previously with reference to FIG. 14. For example, the fill commands for one pixel may be; fill: object=B; type=bitmap; fill_address=32; last_object=false; no_pixel=Z; fill: object=A; type=flat; fill_address=20; last_object=true; no_pixel=Z. The parameter last_object=true is indicative that this fill command is the last fill command for the current pixel. The parameter no_pixel is a number 1 to 4 indicating the number of consecutive pixels to which this fill command applies commencing with the current pixel. The value of this parameter is determined latter during the method 1600 just prior to sending the fill command. Preferably, the fill command for an object also includes a x-independent flag (eg type). As mentioned earlier, this flag indicates whether or not the color of this active object is constant for a given Y (ie scanline).

After the generating step 1610, the method 1600 then determines 1612 whether the objects associated with the fill commands generated during the current pass of the loop are x-independent with reference to the type parameter.

In the event the decision block 1612 determines all objects associated with the fill commands generated during the current pass of the loop are x-independent, the method 1600 then sends 1614 these fill commands to the Fill Color Determination Module 600, Pixel Compositing Module 700, and Pixel Output Module 800. Prior to sending 1614 these fill commands, the method 1600 sets the parameter no_pixel of the fill commands to one(1). After step 1614, the method 1600 increments 1615 the variable current_x by one and proceeds to step 1616.

The method 1600 then sends 1616 a command "repeat (new_X−current_x)", if (new_X−current_x)>0, where new_X is the value of the X co-ordinate of the next edge crossing message(s) in scanline order and current_x is the current value of the variable current_x. In this case, the above-mentioned flag of the repeat command is set OFF. This indicates that the fill commands for the current value of current_x are to be repeated for subsequent locations. The method then proceeds to step 1618. However, if the value new_X−current_x is equal to zero then a repeat command is not sent and the method proceeds directly to step 1618.

The method 1600 then sets 1618 the variable current_x to the value of new_X, and returns to step 1604 for processing of the next edge crossing message(s), which have an edge crossing at new_X, during the next pass of the loop.

On the other hand, if the decision block 1612 determines that one or more objects of the fill commands generated during the current pass of the loop are x-dependent, the method 1600 then proceeds to decision block 1626. The latter may occur, for example if one of the objects is a bitmap. Namely, in the event the decision block 1612 returns FALSE (No), then the method 1600 proceeds to decision block 1626.

The decision block 1626 determines whether the value current_x+3 is less than new_X. In the event the decision block 1626 returns TRUE (Yes), the method 1600 sends 1628 one or more fill commands valid for four pixels. Specifically, the method 1600 sends 1628 the fill commands generated during the current pass of the loop to the Fill Color Determination Module 600, Pixel Compositing Module 700, and Pixel Output Module 800. Prior to sending 1628, the method 1600 sets the no_pixel parameter(s) of these fill commands to four. After step 1628, the method increments 1630 the variable current_x by four and returns to decision block 1626. In the event the decision block 1626 again returns TRUE (Yes), the method 1600 sends 1628 another set of the fill commands generated during the current pass of the loop with the no_pixel parameter(s) set to four.

On the other hand, if the decision block 1626 returns false (No), the method 1600 proceeds to decision block 1632. The decision block 1632 determines whether the value current_x+2 is less than new_X. In the event the decision block 1632 returns TRUE (Yes), the method 1600 sends 1634 one or more fill commands valid for three pixels. Specifically, the method 1600 sends 1634 the fill commands generated during the current pass of the loop to the Fill Color Determination Module 600, Pixel Compositing Module 700, and Pixel Output Module 800. Prior to sending 1634, the method 1600 sets the no_pixel parameter(s) of these fill commands to three. After step 1534, the method increments 1530 the variable current_x by three and returns to decision block 1532.

In the event the decision block 1632 returns false (No), the method 1600 proceeds to decision block 1636. The decision block 1636 determines whether the value current_x+1 is less than new_X. In the event the decision block 1636 returns TRUE (Yes), the method 1600 sends 1638 one or more fill commands valid for two pixels. Specifically, the method 1600 sends 1638 the fill commands generated during the current pass of the loop to the Fill Color Determination Module 600, Pixel Compositing Module 700, and Pixel Output Module 800. Prior to sending 1638, the method 1600 sets the no_Pixel parameter(s) of these fill commands to two. After step 1638, the method increments 1540 the variable current_x by two and returns to decision block 1636.

In the event the decision block 1636 returns false (No), the method 1600 proceeds to decision block 1642. The decision block 1642 determines whether the value current_x is less than new_X. In the event the decision block 1642 returns TRUE (Yes), the method 1600 sends 1644 one or more fill commands valid for one pixel. Specifically, the method 1600 sends 1644 the fill commands generated during the current pass of the loop to the Fill Color Determination Module 600, Pixel Compositing Module 700, and Pixel Output Module 800. Prior to sending 1644, the method 1600 sets the no_pixel parameter(s) of these fill commands to one. After step 1644, the method sets 1646 the variable current_x to new_X and returns to step 1604 for processing of the next edge crossing message(s).

On the other hand, if the decision block 1642 returns FALSE (No), the method 1600 sets 1646 the variable current_x to new_X and returns to step 1604 for processing of the next edge crossing message(s).

The method 1600 terminates (not shown) for the current scanline once there are no more edge crossing messages to be processed.

The Fill Determination module 600 when operating in the color operating mode gets the fill commands and generates pixels utilizing the information contained in the parameters of the fill commands. The Fill Determination module 600 outputs one such pixel at a time on the output color channels when operating in the color operating mode. These pixels have a plurality of color components, which are outputted on the respective color output channels of the Fill Determination module 600. The Fill Determination module 600 also passes on the repeat commands to the Pixel Output Module 800 via the color output channels. The Pixel Output Module 800 when receiving a repeat command repetitively outputs the previously outputted pixel a number of times in accordance with the parameter of the repeat command. The Fill Determination Module 600 generates one pixel per fill command, and where there are a plurality of fill commands for a current location in the scanline, the Fill Determination module 600 generates a plurality of pixels for that current location in the scanline, and outputs those pixels one at a time in priority order on the output channels. When the Fill Determination Module 600 generates a plurality of pixels for a current location in the scanline, the Fill Determination Module 600 also generates a compositing message comprising compositing information for compositing these generated pixels. The compositing messages comprise compositing information, which is obtained from the original fill commands. These compositing messages are also passed from the Fill Determination Module 600 to the Pixel Compositing Module 700 via the color output channels.

The Fill Determination Module 600 when operating in the accelerated grey scale operating mode gets the fill commands and generates pixels having one color component utilizing the information contained in the parameters of the fill commands. These pixels are then output on respective color output channels of the fill determination module 600 depending upon the parameter no_pixel of the fill command. For example, if the parameter of the fill command no_pixel=4, then four pixels are simultaneously output on four output channels of the Fill Determination Module 600. The Fill Determination Module 600 also passes on compositing messages using compositing information contained in the fill commands. These compositing messages are passed from the Fill Determination Module 600 to the Pixel Compositing Module 700 via the output channels. In similar fashion these compositing messages may contain a parameter such as no-pixel, whereby a number of pixels maybe output from the Pixel Compositing Module 700 on the output channels simultaneously. In the accelerated grey scale operating mode the Fill Determination Module 600 also passes on the repeat commands in similar fashion to the color operating mode.

INDUSTRIAL APPLICABILITY

It is apparent from the above that the embodiment(s) of the invention are applicable to the computer graphics and printing industries.

The foregoing describes embodiments of the present invention, and modifications and/or changes can be made thereto without departing from the scope and spirit of the invention, the embodiment being illustrative and not restrictive.

I claim:

1. A method of processing pixels of a digital image, said method comprising the steps of:
    configuring an image processor to operate in a first processing mode or a second processing mode, the image processor having a plurality of color output channels;
    processing one color pixel at a time, the one color pixel having a plurality of pixel color components, and outputting the one color pixel by outputting the plurality of pixel color components on respective ones of the color output channels when the image processor is configured in the first processing mode; and
    processing a plurality of pixels each having one pixel color component and outputting the plurality of pixels simultaneously on respective color output channels when the image processor is configured in the second processing mode.

2. A method according to claim 1, wherein the one pixel color component comprises a grey scale component.

3. A method according to claim 1, wherein the plurality of pixel color components comprise red, green, and blue components.

4. A method according to claim 3, wherein the plurality of pixel color components further comprises an opacity component.

5. A method of processing pixels of a digital image, said method comprising the steps of:
    configuring an image processor to operate in a first processing mode or a second processing mode, the image processor comprising a fill color determination module and having a plurality of color output channels;
    generating, in the fill color determination module during the first processing mode, one or more color pixels in response to one or more commands, wherein each color pixel has a plurality of pixel color components and outputting from the fill color determination module one color pixel at a time by outputting the plurality of pixel color components of the one color pixel on respective one of the plurality of color output channels; and
    generating, in the fill color determination module during the second processing mode, a plurality of pixels in response to one or more commands, wherein each pixel has one pixel color component, and outputting from the fill color determination module a plurality of the pixels simultaneously on respective color output channels.

6. A method according to claim 5, wherein one of the one or more commands is a fill command and said method further comprises the step, when in the second processing mode, of:
    generating the fill command comprising a parameter indicating the number of consecutive pixels in raster order to which the fill command applies, wherein the number can vary from one to a maximum number equal to the number of color output channels.

7. A method according to claim 6, wherein one of the one or more commands is a repeat command and said method further comprises, when in the second processing mode, the step of:
    generating the repeat command comprising a parameter indicating a number of consecutive pixels in raster order to which a previous fill command applies.

8. An apparatus for processing pixels of a digital image, said apparatus comprising:
    an image processor, adapted to process pixels of a digital image, said image processor comprising a plurality of color output channels; and
    a controller, adapted to configure the image processor to operate in a first processing mode ro a second processing mode,
    wherein said image processor processes one color pixel at a time, the one color pixel having a plurality of pixel color components, and outputs the one color pixel by outputting the plurality of pixel color components on respective ones or more color output channels when said image processor is confiture in the first processing mode, and
    said image processor processes a plurality of pixels each having one pixel color component and outputs the plurality of pixels simultaneously on respective color output channels when said image processor is configure in the second processing mode.

9. An apparatus according to claim 8, wherein the one pixel color component comprises a grey scale component.

10. An apparatus according to claim 8, wherein the plurality of pixel color components comprise red, green, and blue components.

11. An apparatus according to claim 10, wherein the plurality of pixel color components further comprises an opacity component.

12. An apparatus according to claim 8 for processing pixels of a digital image, the apparatus comprising:
    an image processor comprising a plurality of color output channels and a fill color determination module; and
    a controller adapted to configure the image processor to operate in a first processing mode or a second processing mode,
    said fill color determination module comprising:
        a generator, adapted to generate, during the first processing mode, one or more color pixels in response to one or more commands, wherein each color pixel has a plurality of pixel color components and to output therefrom one color pixel at a time by outputting the plurality of pixel color components of the one pixel on respective ones of the plurality of color output channels; and
        a generator, adapted to generate, during the second processing mode, a plurality of pixels in response to one or more commands, wherein each pixel has one pixel color component and to output therefrom a plurality of the pixels simultaneously on respective color output channels.

13. An apparatus according to claim 12, wherein one of the one or more commands is a fill command and said image processor further comprises:
    a generator, adapted to generate the fill command, during the second color processing mode, the fill command comprising a parameter indicating the number of consecutive pixels in raster order to which the fill command applies, wherein the number can vary from one to a maximum number equal to the number of color output channels.

14. An apparatus according to claim 13, wherein one of the one or more commands is a repeat command and the apparatus further comprises:
    a generator, adapted to generate the repeat command, during the second color processing mode, the repeat command comprising a parameter indicating a number of consecutive pixels in raster order to which a previous fill command applies.

15. A method of processing pixels of a digital image, said method comprising the steps of:

configuring an image processor to operate in a first operating mode or a second operating mode, the image processor having a plurality of color output channels;

generating, during the first operating mode, one or more color pixels having one or more pixel color components;

outputting, during the first operating mode, the generated color pixels one at a time by outputting the one or more pixel color components of each generated pixel on corresponding color output channels;

generating, during the second operating mode, one or more fill commands each comprising a parameter indicating the number of consecutive pixel locations in raster order to which the fill command applies, wherein the number can vary from one to a maximum number equal to the number of the color output channels;

generating, during the second operating mode, one or more pixels in response to one or more fill commands for one or more pixel locations, wherein the number of pixels generated is dependent upon the number of fill commands and the parameter of the fill commands and wherein the generated pixels having have one pixel color component; and outputting, during the second operating mode, one or more pixels at a time by outputting one or more pixels simultaneously on one or more color output channels.

16. A method according to claim 15, wherein said method further comprises the step of:

generating, during the second processing mode, a repeat command comprising a parameter indicating a number of consecutive pixels in raster order to which a previous fill command applies.

17. A method according to claim 15, wherein the one pixel color component comprises a grey scale component.

18. A method according to claim 15, wherein the one or more pixel color components comprise red, green, and blue components.

19. A method according to claim 18, wherein the one or more pixel color components further comprises an opacity component.

20. An apparatus for processing pixels of a digital image, said apparatus comprising:

a host processor, adapted to configure an image processor to operate in a first operating mode or a second operating mode, said image processor having a plurality of color output channels; said image processor comprising:

a fill module, adapted to generate, during the first operating mode, one or more color pixels having one or more pixel color components and to output the generated pixels one at a time by outputting one or more pixel color components of each generated pixel on corresponding color output channels;

a module, adapted to generate, during the second operating mode, one or more fill commands each comprising a parameter indicating the number of consecutive pixel locations in raster order to which the fill command applies, wherein the number can vary from one to a maximum number equal to the number of the color output channels, wherein said fill module, during the second operating mode, generates one or more pixels in response to one or more fill commands for one or more said pixel locations, and simultaneously outputs one or more pixels on corresponding one or more color output channels, wherein the number of pixels generated is dependent upon the number of fill commands and the parameter of the fill commands and wherein the generated pixels each have one pixel color component.

21. A method of processing pixels of a digital image, said method comprising the steps of:

configuring an image processor to operate in a first operating mode or a second operating mode, the image processor having a plurality of color output channels;

generating, during the first operating mode, one or more fill commands;

generating, during the first operating mode, one or more color pixels in response to one or more respective fill commands for a pixel location, wherein the generated color pixels have one or more pixel color components;

outputting, during the first operating mode, the generated pixels one at a time by outputting the one or more pixel color components of each generated pixel on corresponding color output channels;

generating, during the second operating mode, one or more fill commands each comprising a parameter indicating the number of consecutive pixel locations in raster order to which the fill command applies, wherein the number can vary from one to a maximum number equal to the number of the color output channels;

generating, during the second operating mode, one or more pixels in response to one or more fill commands for one or more pixel locations, wherein the number of pixels generated is dependent upon the number of fill commands and the parameter of the fill commands and wherein the generated pixels each having one pixel color component; and outputting, during the second operating mode, one or more pixels simultaneously on corresponding one or more color output channels.

22. A method according to claim 21, wherein said method further comprises the step of:

generating, during the second operating mode, a repeat command comprising a parameter indicating a number of consecutive pixels in raster order to which a previous fill command applies.

23. A method according to claim 21, wherein the one pixel color component comprises a grey scale component.

24. A method according to claim 21, wherein the one or more pixel color components comprise red, green, and blue components.

25. A method according to claim 24, wherein the one or more pixel color components further comprises an opacity component.

26. An apparatus for processing pixels of a digital image, said apparatus comprising:

a host processor, adapted to configure an image processor to operate in a first operating mode or a second operating mode, said image processor comprising:

a priority module, adapted to generate, during the first operating mode, one or more fill commands for corresponding pixel locations; and a fill module, adapted to generate, during the first operating mode, one or more color pixels in response to one or more respective fill commands for the pixel location, and outputting the generated color pixels one at a time by outputting one or more pixel components of each generated color pixel on corresponding color output channels, wherein the priority module, during the second operating mode, generates one or more fill commands each comprising a parameter indicating the number of consecutive pixel locations in raster order to which the fill command applies, wherein the number can vary from one to a maximum number equal to the number of the color output and the fill module, during the second operating mode, generating one or more pixels in response to one or more fill commands for one or more pixel locations, and simultaneously outputting one or more generated pixels on corresponding one or more color output channels, wherein the number of pixels generated is dependent upon the number of fill commands and the parameter of the fill.

27. A method of generating commands for producing pixels of a digital image in an image processor having a plurality of color output channels, said method comprising the steps of:

generating, during a first operating mode, a fill command for a pixel location wherein the fill command specifies a plurality of color components for the pixel location; and generating, during a second operating mode, one or more fill commands each comprising a parameter indicating the number of consecutive pixel locations in raster order to which the fill command applies, wherein the number can vary from one to a maximum number equal to the number of the color output channels and wherein the fill command specifies one color component for each pixel location.

28. Apparatus for generating commands for producing pixels of a digital image in an image processor having a plurality of color input channels, said apparatus comprising:

a generator, adapted to generate, during a first operating mode, a fill command for a pixel location, wherein the fill command specifies a plurality of color components for the pixel location and to generate, during a second operating mode, one or more fill commands each comprising a parameter indicating the number of consecutive pixel locations in raster order to which the fill command applies, wherein the number can vary from one to a maximum number equal to the number of the color output channels, and wherein the fill command specifies one color component for each pixel location.

29. A computer readable medium comprising a computer program for generating commands for producing pixels of a digital image in an image processor having a plurality of color output channels, said computer program comprising:

code for generating, during a first operating mode, a fill command for a pixel location, wherein the fill command specifies a plurality of color components for the pixel location and for generating, during a second operating mode, one or more fill commands each comprising a parameter indicating the number of consecutive pixel locations in raster order to which the fill command applies, wherein the number can vary from one to a maximum number equal to the number of the color output channels, and wherein the fill command specifies one color component for each pixel location.

30. A computer program product comprising machine-readable program code recorded on a machine-readable recording medium, for controlling the operation of a data processing apparatus on which the program code executes to perform a method of processing pixels of a digital image, said method comprising the steps of:

configuring an image processor to operate in a first processing mode or a second processing mode, the image processor having a plurality of color output channels;

processing one color pixel at a time, the one color pixel having a plurality of pixel color components, and outputting the one color pixel by outputting the plurality of pixel color components on respective ones of the color output channels when the image processor is configured in the first processing mode; and processing a plurality of pixels simultaneously on respective output channels when the image processor is configured in the second processing mode.

* * * * *

UNITED STATES PATENT AND TRADEMARK OFFICE
CERTIFICATE OF CORRECTION

PATENT NO.    : 6,795,048 B2
DATED         : September 21, 2004
INVENTOR(S)   : Kok Tjoan Lie It is certified that error appears in the above-identified patent and that said Letters Patent is hereby corrected as shown below:

<u>Title page,</u>
Item [57], ABSTRACT,
Line 17, "components" should read -- component --.

<u>Drawings,</u>
Sheet 1, "Permanant" should read -- Permanent --.

<u>Column 5,</u>
Line 43, "illustrates" should read -- illustrate --.

<u>Column 7,</u>
Line 26, "(eg." should read -- (e.g., --.

<u>Column 8,</u>
Line 6, "for" should be deleted; and
Line 16, "(eg." should read -- (e.g., --    .

<u>Column 9,</u>
Line 48, "(eg" should read -- (e.g., --.

<u>Column 10,</u>
Line 13, "is" should be deleted.

<u>Column 11,</u>
Line 56, "(eg." should read -- (e.g., --; and
Line 64, "(ie." should read -- (i.e., --.

<u>Column 12,</u>
Line 38, "table 530)" should read -- table 530, --.

<u>Column 13,</u>
Line 15, "module 500" should read -- module 500, --;
Line 32, "(eg:" should read -- (e.g., --; and
Line 55, "is" should be deleted.

<u>Column 14,</u>
Line 60, "terms" should read -- terms, --.

<u>Column 15,</u>
Line 8, "are" should be deleted; and
Line 61, "upto" should read -- up to --.

UNITED STATES PATENT AND TRADEMARK OFFICE
CERTIFICATE OF CORRECTION

PATENT NO.   : 6,795,048 B2
DATED        : September 21, 2004
INVENTOR(S)  : Kok Tjoan Lie It is certified that error appears in the above-identified patent and that said Letters Patent is hereby corrected as shown below:

Column 16,
Line 5, "command" should read -- command, --; and
Line 20, "ie." should read -- i.e., --.

Column 18,
Line 62, "is" should be deleted.

Column 19,
Line 19, "Ouput" should read -- Output --; and
Line 39, "pixel" should read -- pixels --.

Column 20,
Line 12, "viz" should read -- via --;
Lines 30 and 55, "no__Pixel=4;" should read -- no__pixel=4; --;
Line 59, "no__Pixel=3;" should read -- no__pixel=3; --; and
Line 64, "10. repeat 1;" should read -- 10. repeat 1. --.

Column 21,
Line 10, "operating" should read -- Operating --;
Line 34, "scale operating mode" should read -- Scale Operating Mode --; and
Lines 44, 53 and 55, "pixel" should read -- Pixel --.

Column 22,
Lines 8 and 14, "will in" should read -- will be in --; and
Line 15, "upto" should read -- up to --.

Column 23,
Lines 1 and 23, "is" should read -- are --;
Line 63, "(eg" should read -- (e.g., --; and
Line 65, "(ie" should read -- (i.e., --.

Column 24,
Line 50, "(yes)," should read -- (Yes), --.

Column 25,
Line 20, "last previous" should read -- previous --;
Lines 38 and 60, "is" should read -- are --; and
Line 52, "(no)" should read -- (No) --.

UNITED STATES PATENT AND TRADEMARK OFFICE
CERTIFICATE OF CORRECTION

PATENT NO.   : 6,795,048 B2
DATED         : September 21, 2004
INVENTOR(S)  : Kok Tjoan Lie It is certified that error appears in the above-identified patent and that said Letters Patent is hereby corrected as shown below:

Column 26,
Line 8, "(yes)" should read -- (Yes) --;
Line 38, "latter" should read -- later --;
Line 40, "(eg" should read -- (e.g., --;
Line 42, "(ie" should read -- (i.e., --; and
Line 54, "one(1)." should read -- one (1). --.

Column 27,
Lines 28, 42 and 56, "false" should read -- FALSE --.

Column 29,
Line 24, "comprise" should read -- comprises --; and
Line 42, "one" should read -- ones --.

Column 30,
Line 5, "ro" should read -- or --;
Line 11, "or more" should read -- of the --;
Line 12, "confiture" should read -- configured --;
Line 17, "configure" should read -- configured --;
Line 22, "comprise" should read -- comprises --;
Line 27, "according to claim 8" should be deleted; and
Line 28, "the" should read -- said --.

Column 31,
Line 24, "having" should be deleted;
Line 32, "processing" should read -- operating --;
Line 39, "comprise" should read -- comprises --;
Line 49, "channels;" should read -- channels, --;
Line 56, "channels;" should read -- channels; and --; and
Line 66, "said" should be deleted.

Column 32,
Line 33, "having" should read -- have --; and
Line 47, "comprise" should read -- comprises --.

UNITED STATES PATENT AND TRADEMARK OFFICE
CERTIFICATE OF CORRECTION

PATENT NO. : 6,795,048 B2
DATED : September 21, 2004
INVENTOR(S) : Kok Tjoan Lie It is certified that error appears in the above-identified patent and that said Letters Patent is hereby corrected as shown below:

Column 33,
Line 7, "output" should read -- output, --;
Line 9, "erating" should read -- erates --; and
Line 11, "outputting" should read -- outputs --.

Signed and Sealed this

Second Day of August, 2005

JON W. DUDAS
*Director of the United States Patent and Trademark Office*